3,513,153
SYMMETRICAL DISAZO DYES CONTAINING
PHTHALIMIDO GROUPS
Walter Horstmann, Cologne-Buchheim, and Edgar Siegel, Leverkusen, Germany, assignors to Farbenfabriken Bayer Aktiengesellschaft, Leverkusen, Germany, a corporation of Germany
No Drawing. Filed Aug. 18, 1966, Ser. No. 573,196
Claims priority, application Germany, Aug. 27, 1965, F 47,014; Mar. 11, 1966, F 48,637
Int. Cl. C09b 43/12
U.S. Cl. 260—152
12 Claims

ABSTRACT OF THE DISCLOSURE

Azo dyestuffs free from sulfonic acid groups which correspond to the formula

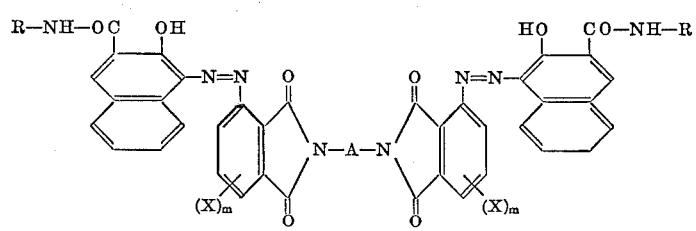

in which the radicals R represent aromatic radicals; X stands for substituents; $m$ is 0 to 3; and A is a carbocyclic or heterocyclic radical. These dyestuffs are valuable pigment dyestuffs predominantly in the yellow-to-bluish-red range, and they are resistant to deterioration by solvent, light, or heat when incorporated in plastics, lacquers, and papers.

DISCLOSURE

The object of the present invention is to provide a process for the production of valuable new azo dyestuffs which are free from sulphonic acid groups and correspond to the general formula

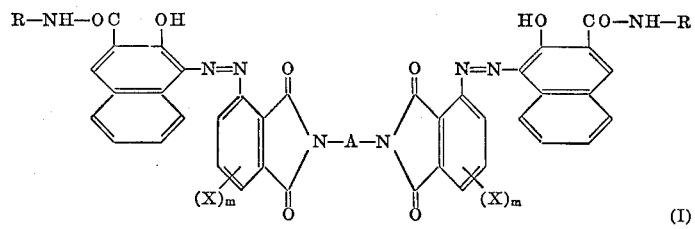

(I)

in which R denotes identical or different aromatic radicals, the radicals X are identical or different substituents, $m$ stands for integers from 0 to 3, and A is a carbocyclic or heterocyclic radical. The following are preferred azo dyestuffs which are free from sulfonic acid groups and correspond to the formula

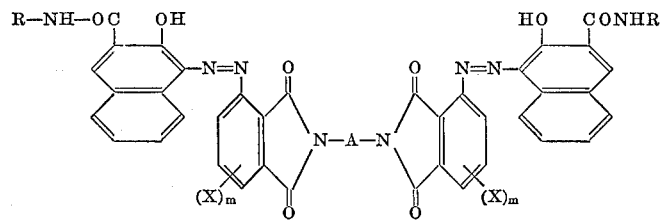

in which the radicals R represent a member selected from the class consisting of naphthyl, phenyl and phenyl substituted with one to three substituents selected from the group consisting of chloro, nitro, methyl, methoxy, ethoxy, acetylamino and benzoylamino; X represents a member selected from the group consisting of nitro, chloro, bromo, fluoro, lower alkyl, lower alkoxy, trifluoromethyl, phenylsulphonyl, methylsulphonyl, ethylsulphonyl, carbo methoxy and carbo ethoxy; $m$ stands for an integer from 0 to 3; and A represents a member selected from the group consisting of phenylene, substituted phenylene, wherein the substituents are 1 to 4 members selected from the group consisting of chloro, methyl, methoxy, ethoxy, and nitro; diphenylene; substituted diphenylene wherein the substituents are selected from the group consisting of chloro, methyl, methoxy, ethoxy, and nitro; cyclohexylene; naphthylene and the divalent radicals

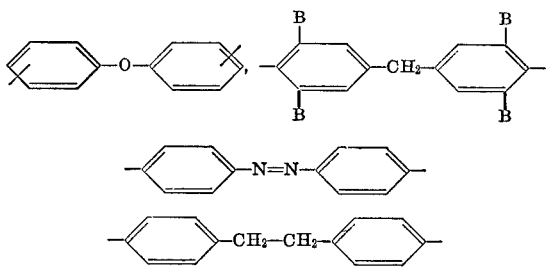

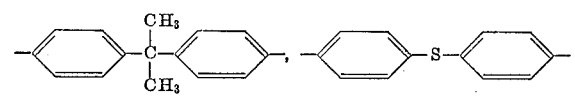

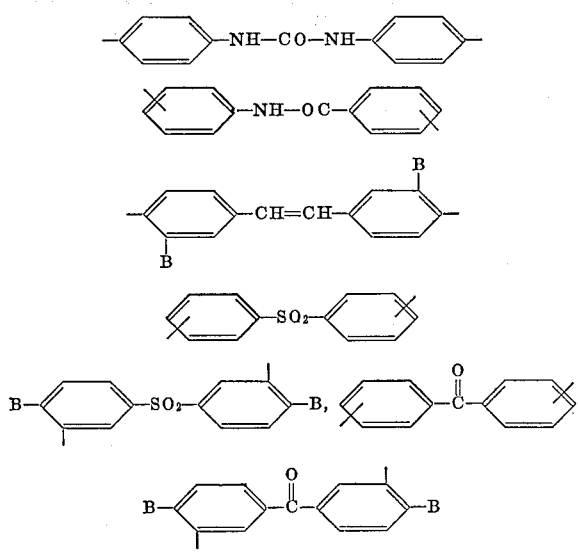

wherein B is selected from the group consisting of hydrogen, chloro, and methoxy

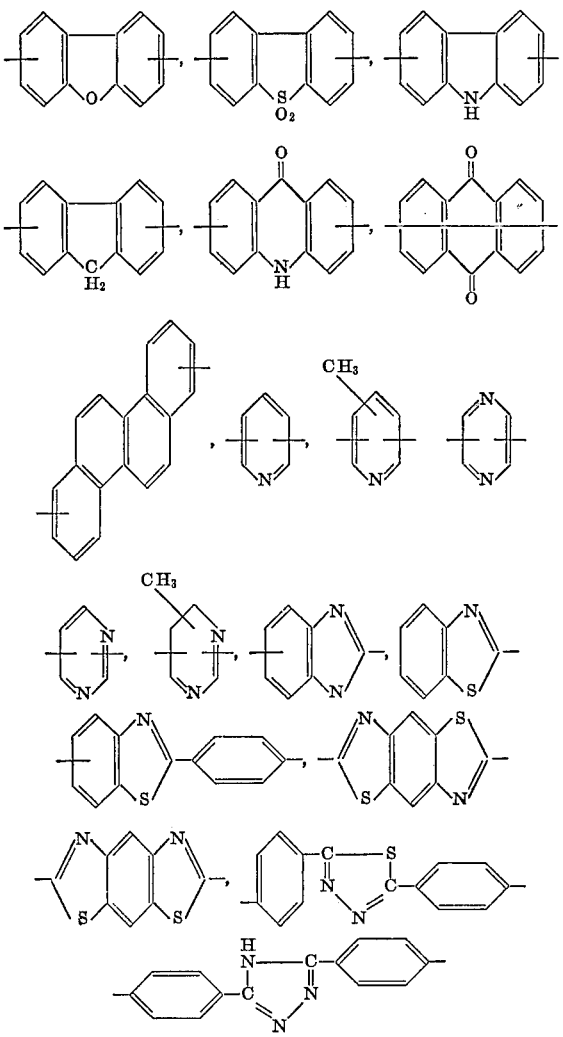

and

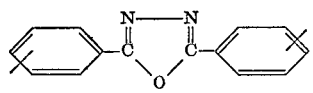

The radicals R may be mono- or polynuclear, those of the benzene and naphthalene series being preferred.

Examples are the following radicals: phenyl; 2- or 3- or 4-methylphenyl-1; 2- or 3- or 4-chlorophenyl-1; 2- or 3- or 4-methoxyphenyl-1; 4-ethoxyphenyl-1; 2-methyl-5-chlorophenyl-1; 2-methyl-4-methoxyphenyl-1; naphthyl-1 or -2; 3-nitrophenyl-1; 2,4-dimethylphenyl-1; 2,4-dimethoxy-5-chlorophenyl-1; 2,5-dimethoxy-4-chlorophenyl-1; 2-methyl-4-chlorophenyl-1 and 2,5-dimethoxy-phenyl-1, 4-acetylaminophenyl-1; 4-benzoylamino-phenyl-1; 2-ethoxyphenyl-1; 2,3-dimethylphenyl-1; 3,5-dimethyl-phenyl-1; 2-methoxy-5-chlorophenyl-1.

Suitable substituents X are, for example: lower alkyl substituents, such as methyl and ethyl; chloro and nitro substituents; lower alkoxy substituents, such as methoxy and ethoxy; fluoro, bromo, methylsulphonyl, ethylsulphonyl, phenylsulphonyl, trifluoromethyl substituents; and carbalkoxy substituents, such as carbomethoxy and carbethoxy.

The carbocyclic radical A is unsaturated or saturated and may be mono- or polynuclear. In the case of polynuclear radicals these may be fused or linked with one another by simple carbon-carbon bonds or also by aliphatic or other bridge members. Examples of suitable bivalent radicals A are:

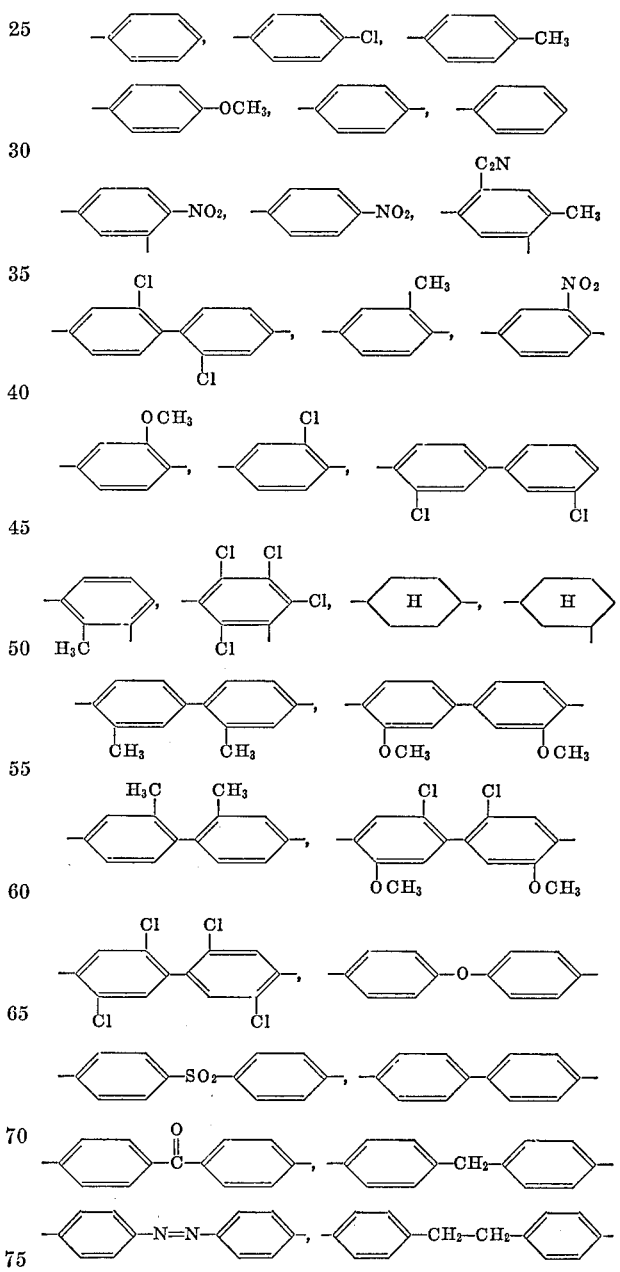

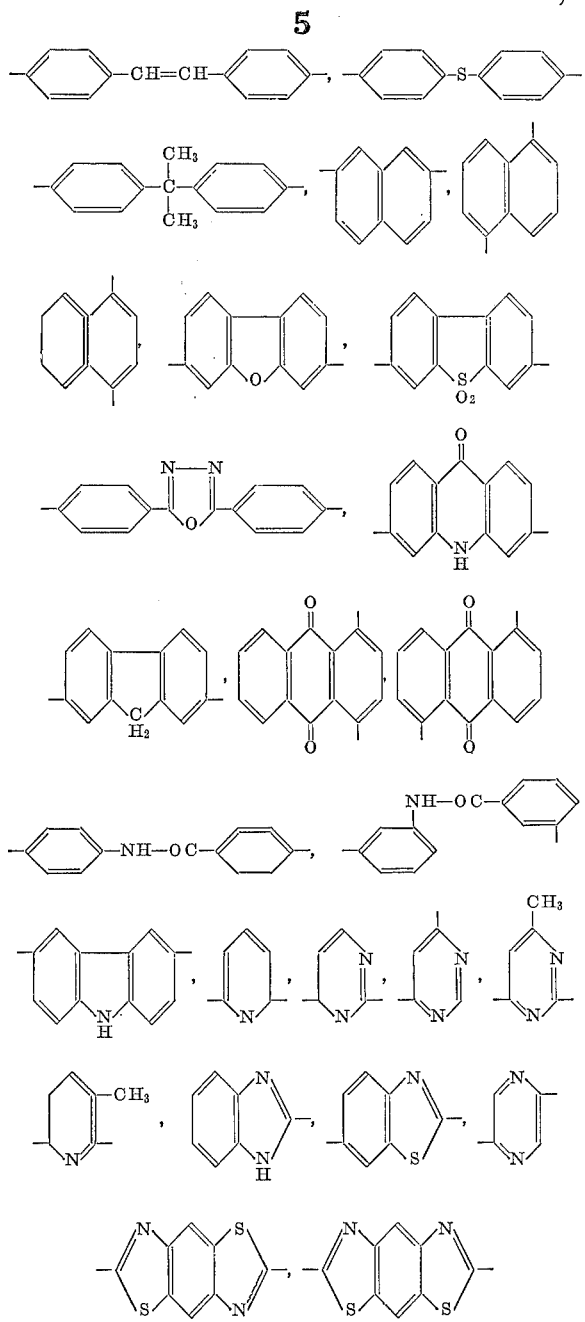

A group of especially valuable dyestuffs in the range of the products of the Formula I corresponds to the formula

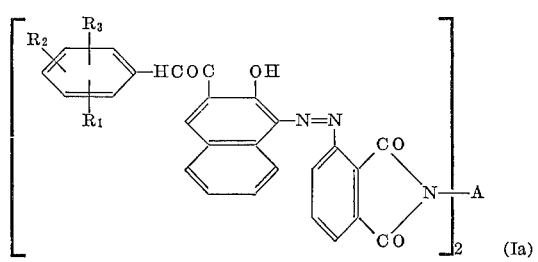

in which $R_1$ stands for hydrogen or for methyl, chloro, nitro, methoxy and ethoxy substituents, $R_2$ for hydrogen or for methyl chloro and methoxy substituents, and $R_3$ for hydrogen or chloro substituents, while A has the same meaning as above.

Suitable radicals

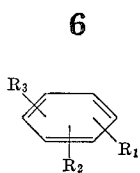

are, in particular, 2- or 3- or 4-methyl- or chloro- or methoxyphenyl-1; 2- or 4-ethoxyphenyl-1; 2-methyl-3-chloro- or 2-methyl-4-chlorophenyl-1; 2,5-dichlorophenyl-1; 2,4-dimethyl-phenyl-1; and naphthyl-1 or -2. The following are preferred azo dyestuffs which are free from sulfonic acid groups and correspond to the formula

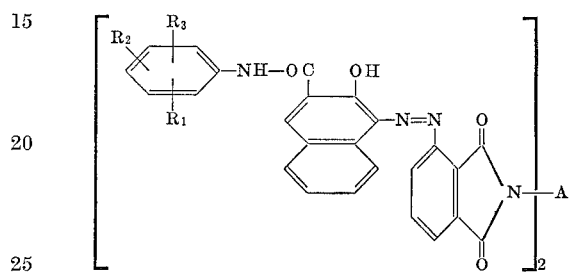

in which $R_1$ stands for hydrogen or chloro, methyl, nitro, methoxy, or ethoxy; $R_2$ stands for hydrogen, or chloro, methyl, or methoxy; $R_3$ stands for hydrogen or chloro; and A represents a member selected from the group consisting of phenylene, substituted phenylene, wherein the substituents are 1 to 4 members selected from the group consisting of chloro, methyl, methoxy, ethoxy, and nitro; diphenylene; substituted diphenylene wherein the substituents are selected from the group consisting of chloro, methyl, methoxy, ethoxy and nitro; cyclohexylene; naphthylene and the divalent radicals

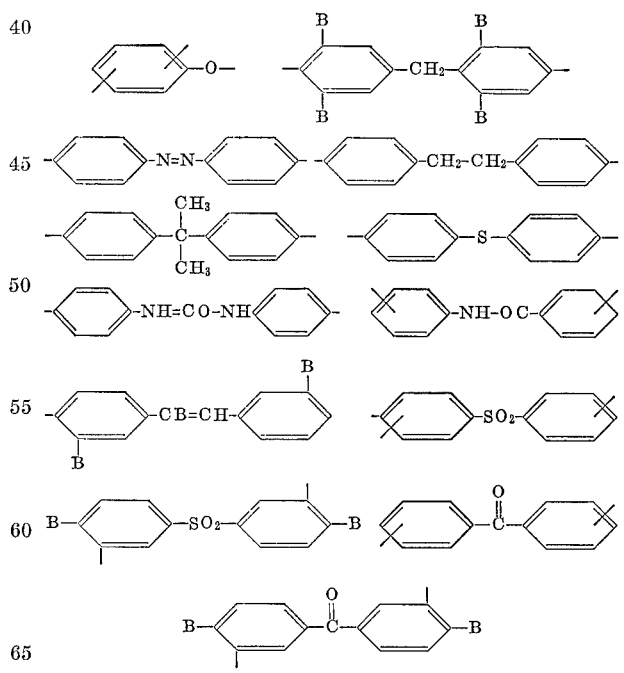

wherein B is selected from the group consisting of hydrogen, chloro, and methoxy

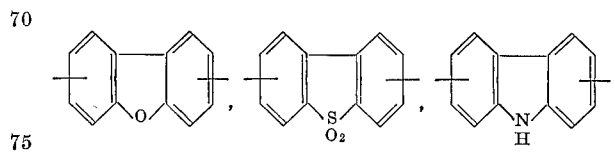

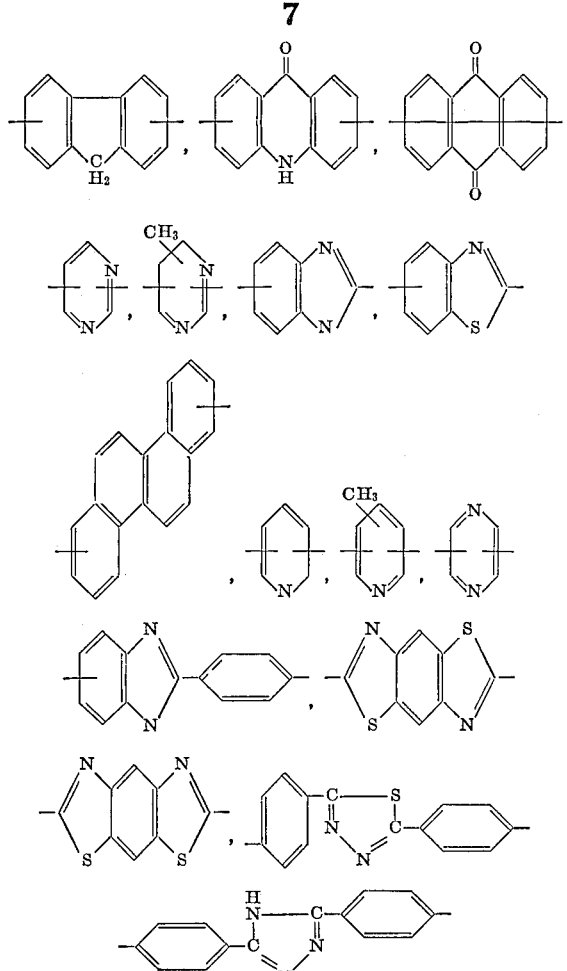

and

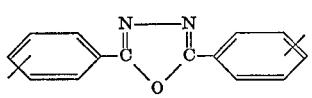

The process for the production of the new azo dyestuffs of the Formulae I and Ia consists in that azo compounds of the formula

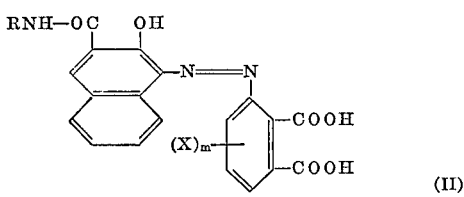

in which R, X and $m$ have the same meaning as above, or azo compounds of the formula

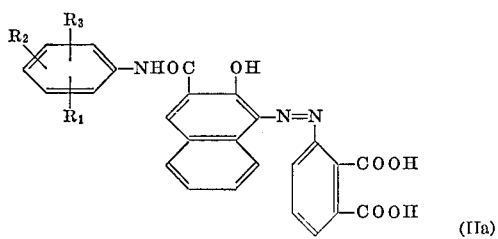

in which $R_1$, $R_2$ and $R_3$ have the same meaning as above, or functional derivatives of these azo-dicarboxylic acids, especially the mono- or diesters, mono- or diamides, di-carbonimides or anhydrides, are reacted with diamines of the general formula $$H_2N-A-NH_2 \quad (III)$$

in which A has the same meaning as above, in a molar ratio of components (II) or (IIa) to component (III) of approximately 2:1 in the presence of acidic condensation agents and that the components are so chosen that the final dyestuffs are free from sulphonic acid groups. The reaction of the starting components is preferably carried out in a high-boiling organic solvent or solvent mixture, but the components themselves can also serve as organic solvents. The condensation takes place at an elevated temperature, generally in the range from 80° C. to 240° C., preferable between 130° C. and 180° C.

The monoazo dyestuffs (II) and (IIa) are obtained in the usual manner by diazotising the optionally substituted aminophthalic acids or their functional derivatives and coupling with 2-hydroxy-naphthoic acid-3-arylides, the components being free from sulphonic acid groups. The following diazo components can be used for this purpose, for example: 3-amino-phthalic acid; 3-amino-phthalic acid mono- and -diesters, such as 3-amino-phthalic acid monomethyl ester-1() or 3-aminophthalic acid dimethyl ester; 3-aminophthalimide; 3-amino-6-methyl-phthalic acid; 3-amino-4-methyl-phthalic acid; 3-amino-5-methyl-phthalic acid; 3-amino-5-nitro-phthalic acid; 3-amino-6-nitro-phthalic acid; 3-amino-5-methoxy-phthalic acid; 3-amino-4-methoxy-phthalic acid; 3 - amino-6-methoxy-phthalic acid; 3-amino-6-chloro-phthalic acid; 3-amino-4-chloro-phthalic acid; 3-amino-6-bromo-phthalic acid; 3-amino-6-fluoro-phthalic acid; 3-amino-5,6-dimethoxy-phthalic acid; 3-amino-6-cyano-phthalic acid; 3-amino-5-methoxy-6-ethoxy-phthalic acid; 3-amino-6-methylsulphonyl-phthalic acid; 3-amino-6-trifluoromethyl-phthalic acid; 3-amino-5-carbethoxy-phthalic acid; 3-amino-6-carbethoxy-phthalic acid.

The following coupling components can be used, for example:

2-hydroxy-naphthoic acid-(3)-anilide;
2-hydroxy-naphthoic acid-(2)-(o-anisidide);
2-hydroxy-naphthoic acid-(3)-(p-anisidide);
2-hydroxy-naphthoic acid-(3)-(o-toluidide);
2-hydroxy-naphthoic acid-(3)-(p-toluidide);
2-hydroxy-naphthoic acid-(3)-(3'-nitroanilide);
2-hydroxy-naphthoic acid-(3)-(2',4'-dimethyl)- anilide;
2-hydroxy-naphthoic acid-(3)-(2'-chloro)-anilide;
2-hydroxy-naphthoic acid-(3)-(4'-chloro)-anilide;
2-hydroxy-naphthoic acid-(3)-(2'-methyl-5'-chloro)-anilide;
2-hydroxy-naphthoic acid-(3)-(2',4'-dimethoxy-5'-chloro)-anilide;
2-hydroxy-naphthoic acid-(3)-(2',5'-dimethoxy-4'-chloro)-anilide;
2-hydroxy-naphthoic acid-(3)-(2'-methyl-4'-chloro)-anilide;
2-hydroxy-naphthoic acid-(3)-(2'-methyl-4'-methoxy)-anilide;
2-hydroxy-naphthoic acid-(3)-[naphthyl(1')-]-amide;
2-hydroxy-naphthoic acid-(3)-[naphthyl(2')-]-amide;
2-hydroxy-naphthoic acid-(3)-(2',5'-dimethoxy)-anilide;
2-hydroxy-naphthoic acid-(3)-(4'-ethoxy)-anilide.
2-hydroxy-naphthoic acid-(3)-(4'-acetylamino)-anilide;
2-hydroxy-naphthoic acid-(3)-(4'-benzoylamino)-anilide;
2-hydroxy-naphthoic acid-(3)-(2'-ethoxy)-anilide;
2-hydroxy-naphthoic acid-(3)-(2',3'-dimethyl)-anilide;
2-hydroxy-naphthoic-(3)-(2'-methoxy-5'-chloro)-anilide.

The alkyl, aryl, aralkyl mono- and diesters and the anhydrides or imides of the above substituted phthalic acids can also be used. Compared with the free dicarboxylic acids, the esters are frequently more readily soluble in the high-boiling organic solvent used for the condensation.

The following diamines (III) can be used, for example, for the condensation of the azo compounds according to the invention:

1,4-diamino-2-chloro-benzene;
1,4-diamino-2-methyl-benzene;
1,4-diamino-2,5-dimethyl-benzene;
1,4-diamino-2-nitro-benzene;
1,4-diamino-2-methyl-5-methoxy-benzene;
1,4-diamino-2-methoxy-benzene;
1,4-diamino-2,5-diethoxy-benzene;
1,3-diamino-benzene;
1,3-diamino-4-methyl-benzene;
1,3-diamino-4-chloro-benzene;
1,3-diamino-4-methoxy-benzene;
1,3-diamino-4-methyl-6-nitro-benzene;
1,3-diamino-2,4,5,6-tetrachloro-benzene;
1,4-diamino-2,3,5,6-tetrachloro-benzene;
1,2-diamino-benzene;
1,2-diamino-4-nitro-benzene;
1,3-diamino-2-methyl-benzene;
1,4-diamino-benzene;
4,4'-diamino-2,2'-dichloro-diphenyl;
4,4'-diamino-3,3'-dichloro- or -3,3'-dimethyl- or
   -3,3'-dimethoxy-diphenyl;
4,4-diamino-2-nitro-diphenyl;
4,4'-diamino-3-methyl-diphenyl;
4,4'-diamino-3,3'-diethoxy-diphenyl;
4,4'-diamino-2,2'-dimethyl-diphenyl;
4,4'-diamino-3,3'-dimethyl-6,6'-dinitro-diphenyl;
4,4'-diamino-2,2'-dichloro-5,5'-dimethoxy-diphenyl;
4,4'-diamino-2,2',5,5'-tetrachloro-diphenyl;
4,4'-diamino-3,3'5,5'-tetramethyl-diphenyl;
4,4'-diamino-octachloro-diphenyl;
4,4'-diamino-diphenyl ether;
4,4'-diamino-diphenyl-sulphone;
3,3'-diamino-4,4'-dichloro-diphenylsulphone;
3,3'-diamino-4,4'-dimethoxy-diphenylsulphone;
hexahydro-phenylene-diamine-1,4;
hexahydro-phenylene-diamine-1,3;
4,4'-diamino-diphenyl-ketone;
3,3'-diamino-diphenyl-ketone;
3,3'-diamino-4,4'-dichloro-diphenyl-ketone;
4,4'-diamino-diphenyl-methane;
4,4'-diamino-dibenzyl;
3,3'-diamino-diphenyl-methane;
4,4'-diamino-3,3',5,5'-tetrachloro-diphenyl-methane;
4,4'-diamino-stilbene;
4,4'-diamino-benzanilide;
2,8-diamino-chrysene,1,4-diamino-naphthalene;
2,7-diamino-naphthalene;
2,6-diamino-naphthalene;
2,6-diamino-pyridine;
3,6-diamino-pyrazine;
2,6-diamino-benzothiazole;
2-(4'amino-phenyl)-5-amino-benzothiazole;
2,5-bis-(4'-aminophenyl)-oxodiazole;
4,4'-diamino-diphenyl-urea;
4,4'-diamino-3,3'-dimethoxy-stilbene;
2-(4'-aminophenyl)-6-amino-benzothiazole;
2,7-diamino-fluorene;
2,7-diamino-diphenylene-oxide;
2,7-diamino-diphenylene-sulphone;
2,5-bis-(4'-aminophenyl)-thiadiazole;
2,6-bis-(4'-aminophenyl)-triazole;
1,4-diamino-anthraquinone;
1,5-diamino-anthraquinone;
2,6-diamino-pyrimidine;
4,4'-diamino-diphenyl.

The following solvents boiling above 80° C. can be used, for example, for the condensation of the monoazo dyestuffs (II) or (IIa) with the diamines (III) in high-boiling organic solvents: benzene, toluene, xylenes, chlorobenzenes, nitrobenzene, quinoline, glacial acetic acid, cyclohexane, 1,2,3,4-tetrahydronaphthalene, naphthalene, tetrachloroethylene, di-n-butyl ether, anisole, diphenyl ether, decalin and mixtures of such solvents.

Suitable acidic condensation agents are, for example: acetic acid, propionic acid, anhydrous sodium acetate, zinc chloride, ferric chloride, aluminum chloride, hydrochloric acid, sulphuric acid, oxalic acid, formic acid, boron trifluoride and orthophosphoric acid.

The reaction of the dicarboxy-azo compounds (II) or (IIa) or of their functional derivatives with the diamino components (III) is carried out in a ratio of approximately 2:1. A slight excess of components (II) of (IIa) is frequently desirable, in order to react the components (III) completely.

Symmetrical or asymmetrical dyestuffs of the formula (I) can be synthetised, depending on the choice of the components (II) or (IIa).

The products obtained according to the present process are valuable pigment dyestuffs the shades of which are predominantly in the yellow to bluish-red range. The dyestuffs are sometimes obtained in the amorphous state, but usually in crystalline form and in good yields. They are characterised by good fastness to solvents, light and migration and by good thermal stability and are preferably used for the colouring of plastics, such as polyvinyl chloride containing plasticisers, and copolymers or grafted polymers of acrylonitrile-butadiene-styrene, of lacquers and papers and for the production of printing inks and pigment pastes.

Belgian patent specification No. 652,251 already describes pigment dyestuffs of the general formula

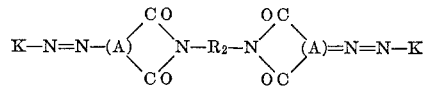

in which K is defined as the radical of any coupling component, A is an aromatic or heterocyclic system and $R_2$ as a bivalent alkyl, aryl, aralkyl or hetero radical.

However, this patent specification does not contain a single example of a dyestuff of the general formula there indicated, and not even an example of only one of the components K, A and $R_2$. The patent specification otherwise only contains a few, very general data regarding processes for the production of the pigment dyestuffs.

The following examples are given for the purpose of illustrating the invention; the parts are parts by weight and the temperatures are given in degrees centrigrade.

EXAMPLE 1

65 parts 3-amino-phthalic acid are dissolved in 600 parts dilute hydrochloric acid (5:1) and diazotised at 0–5° with a solution of 25 parts sodium nitrite in 100 parts water. The excess nitrite is destroyed by means of amidosulphonic acid.

The diazo suspension is introduced into a solution of 100 parts 2-hydroxy-naphthoic acid-(3)-2'-toluidide in 700 parts ethanol, to which a solution of 100 parts caustic soda in 200 parts water has been added and which is cooled to 5–10°. The reaction mixture is subsequently further stirred at 10–15° for 4 hours, adjusted to pH 1–2 by the addition of 10% hydrochloric acid, washed with water until free from acid, and dried at 80°. 160 parts monoazo-o-dicarboxylic acid are thus obtained.

9.8 parts of this dyestuff are suspended in 500 parts o-dichlorobenzene, 50 parts glacial acetic acid are added and the reaction mixture is heated at 100–120° for 2 hours. 1.22 parts 1,4-diamino-2-methyl-benzene are then added and heating is continued at 130–140° for 10–12 hours. The pigment is isolated at 50–60°, washed with 100 parts o-dichlorobenzene at 50° in 4 portions and dried in a vacuum at 80° until the weight is constant.

7.6 parts of the red disazo pigment of the formula

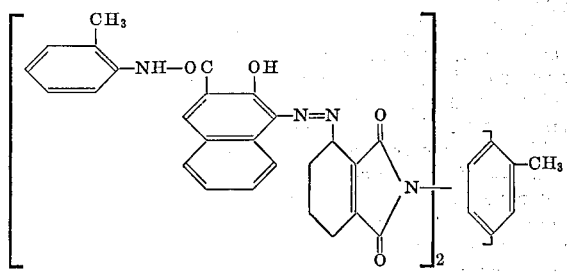

are thus obtained.

EXAMPLE 2

9.80 parts of the azo dyestuff prepared from diazotised 3-amino-phthalic acid and 2-hydroxy-naphthoic acid-(3)-2′-toluidide are heated in a mixture of 500 parts o-dichlorobenzene and 50 parts glacial acetic acid at 120° for 2 hours. 1.98 parts 4,4′-diamino-diphenyl-methane are then added and the reaction mixture is kept at 120–130° C. for a further 12–15 hours. The precipitated pigment is filtered off with suction at 50–60, washed with 50 parts warm o-dichlorobenzene and dried in a vacuum at 80° until the weight is constant. 7.1 parts of the yellowish-red pigment dyestuff of the formula

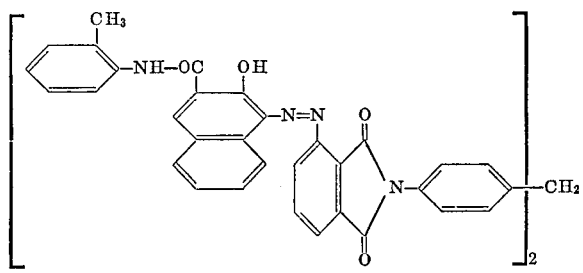

are obtained. The pigment is characterised by a very good fastness to light. Its fastness to lacquer coating at 130° is also very good.

EXAMPLE 3

9.60 parts of the monoazo dyestuff prepared from diazotised 3-amino-phthalic acid and 2-hydroxy-naphthoic acid-(3)-anilide are suspended in 250 parts chlorobenzene, 25 parts glacial acetic acid are added and the reaction mixture is heated at 100° C. for 1 hour. 1.58 parts 2,7-diamino-naphthalene are then added and heating is continued at 120° for 10–12 hours. The pigment is filtered off with suction at about 50°, washed with 50 parts chlorobenzene at 50° and dried in a vacuum at 80°. 8.25 parts of the red pigment dyestuff of the formula

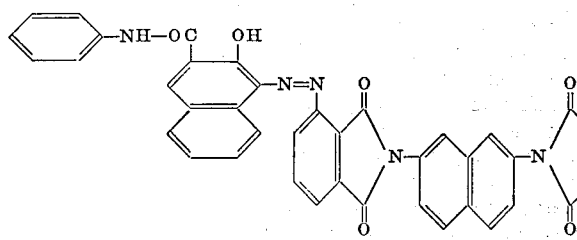

are obtained.

EXAMPLE 4

44.5 parts 3-amino-phthalic acid are suspended in 500 parts water, 250 parts ice and 80 parts concentrated hydrochloric acid are added and the mixture is diazotised at 0–5° with a solution of 17.2 parts sodium nitrite in 100 parts water. The excess nitrite is destroyed by means of amidosulphonic acid.

74 parts 2-hydroxy-naphthoic acid-(3)-4′-chloroanilide are suspended in 200 parts ethanol, 400 parts of a 10% sodium hydroxide solution are added and the above diazo suspension is introduced in portions at 5–10°. As soon as the coupling is completed, the reaction mixture is acidified with semi-concentrated hydrochloric acid, the dyestuff is filtered off with suction, washed with water until neutral and dried at 80°. 106 parts of monoazo compound are obtained. 10.3 parts of the monoazo compound so obtained are heated in 250 parts o-dichlorobenzene and 25 parts glacial acetic acid at 100° for 2 hours. 1.14 parts hexahydro-phenylene-diamine-1,4 are then added and the mixture is kept at 130–140° for a further 20 hours. The precipitated pigment is filtered off with suction at 40°, washed with warm o-dichlorobenzene and light petrol and dried at 60° until the weight is constant. 9.2 parts of the brilliant red diazo dyestuff of the formula

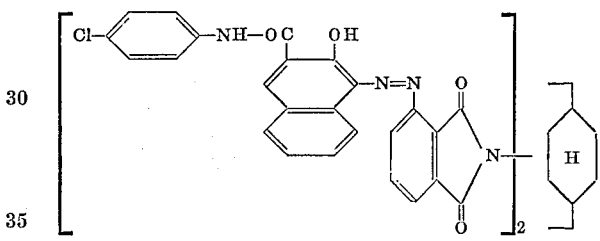

are obtained.

EXAMPLE 5

10.3 parts of the monoazo dyestuff prepared from 3-amino-phthalic acid and 2-hydroxy-naphthoic acid-(3)-4′-chloroanilide are heated in 50 parts o-dichlorobenzene and 50 parts glacial acetic acid at 120° for 4 hours. 1.97 parts 3,6-diamino-carbazole are then added and the reaction mixture is kept at 135° for a further 10 hours. The precipitated pigment is filtered off with suction, washed with 150 parts o-dichloro-benzene at 50° and dried in a vacuum at 80°. 10.6 parts of the deep red pigment dyestuff of the formula

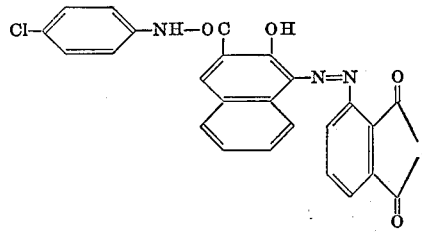

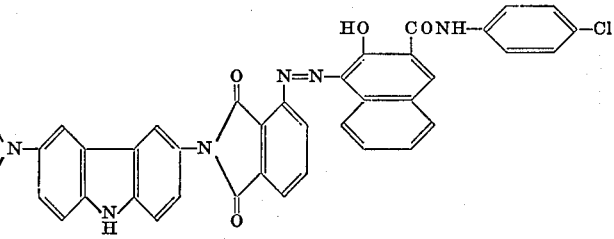

are obtained.

EXAMPLE 6

90 parts 3-amino-phthalic acid are suspended in 1000 parts water, 500 parts ice and 162 parts concentrated

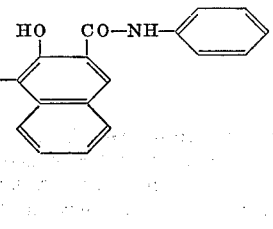

hydrochloric acid are added and the mixture is diazotised at 0–5° with a solution of 34.5 parts sodium nitrile in 200 parts water.

154 parts 2 - hydroxy-naphthoic acid-(3)-4'-ethoxyanilide are suspended in 300 parts alcohol, a solution of 80 parts caustic soda in 200 parts water is added, 500 parts ice are thrown in and the above diazo suspension is then introduced in portions at 5–10°. When the coupling is completed, the reaction mixture is acidified with semi-concentrated hydrochloric acid, the product is filtered off with suction, washed with water until neutral and dried at 80°. The yield of monoazo dyestuff is 218 parts. The dyestuff is converted into the anhydride by heating it in 1000 parts chlorobenzene with 100 parts acetic anhydride at about 100° for 2 hours. The product is filtered off with suction, washed with light petrol, dried at 80°, and 179 parts monoazo-o-dicarboxylic anhydride of M.P. 296–298° are thus obtained.

10.0 parts of the anhydride and 2.0 parts 4,4'-diamino-diphenyl ether are heated in 500 parts o-dichlorobenzene and 50 parts glacial acetic acid at 130–140° for 12 hours, the pigment is subsequently filtered off with suction at 60°, washed with warm o-dichlorobenzene and dried in a vacuum at 80°. The yield of pigment of the formula

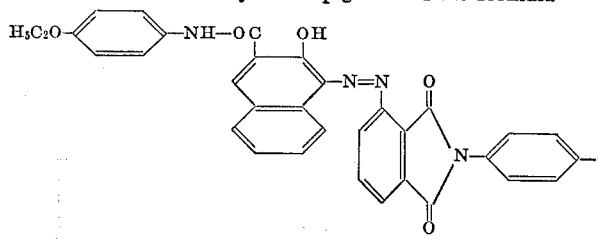

is 10.8 parts. The product has good fastness to light and lacquer coating.

EXAMPLE 7

10.5 parts of the azo dyestuff prepared from 3-amino-phthalic acid and 2-hydroxy-naphthoic acid-(3)-4-ethoxyanilide are heated in 500 parts chlorobenzene with 50 parts acetic acid at 100° for 3 hours. 2.22 parts of the diamino-benzo-bis-thiazole of the formula

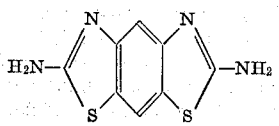

are then added and heating is continued at 130° for 12 hours. The precipitated pigment is filtered off with suction at 60°, washed with 100 parts chlorobenzene at 50° and subsequently with 200 parts light petrol, and dried. The yield is 11.1 parts of the red pigment of the following formula:

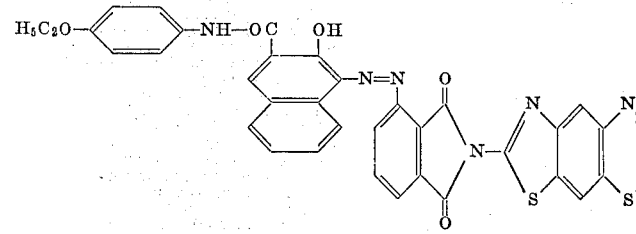

EXAMPLE 8

19.5 parts 3-amino-6-methyl-phthalic acid are suspended in 250 parts water, 150 parts ice and 35 parts concentrated hydrochloric acid are added and the mixture is diazotised with a solution of 7.0 parts sodium nitrite in 40 parts water. The excess nitrite is removed by means of amidosulphonic acid.

31.2 parts 2-hydroxy-naphthoic acid-(3)-2'-methyl-4'-chloroanilide are suspended in 40 parts ethanol, 160 parts of a 10% sodium hydroxide solution and 100 parts ice are added and the diazo suspension is introduced at 10–15°. The reaction mixture is stirred at room temperature for 1–2 hours, adjusted to pH 2 by means of semi-concentrated hydrochloric acid, the dyestuff is filtered off with suction, washed with water until neutral adn dried at 80°. The yield is 46 parts monoazo dyestuff.

10.9 parts of this monoazo dyestuff are heated in 200 parts o-dichlorobenzene and 20 parts glacial acetic acid at 120° for 4 hours, 2.12 parts 4,4'-diamino-dibenzyl are then added and the reaction mixture is kept at 135° for 20 hours. The precipitated pigment is filtered off with suction at 50°, washed with o-dichlorobenzene at 50° and dried in a vacuum at 80° until the weight is constant. Yield: 10.2 parts of the disazo pigment of the formula

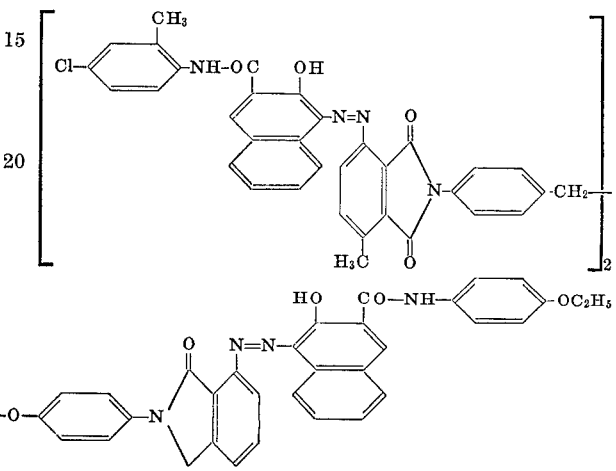

EXAMPLE 9

21 parts 3-amino-6 - methoxy-phthalic acid are suspended in 250 parts water, 150 parts ice and 35 parts concentrated hydrochloric acid are added, and the mixture is diazotised at 0–5° with a solution of 7.0 parts sodium nitrite in 40 parts water.

30 parts 2-hydroxy-naphthoic acid-(3)-2'-methoxy-anilide are suspended in 40 parts ethanol, 160 parts of a 10% sodium hydroxide solution and 100 parts ice are added, and the above diazo suspension is introduced in portions at 5–10°. The reaction mixture is subsequently stirred at room temperature for 2 hours, acidified with hydrochloric acid (1:1), the dyestuff is filtered off with suction, washed with water until neutral and dried. Yield: 45 parts monoazo dyestuff.

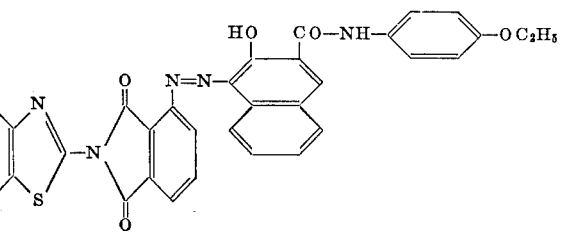

10.8 parts of this dyestuff are heated in 250 parts chlorobenzene and 25 parts glacial acetic acid at 110° for 2 hours, 1.22 parts 1,3-diamino-2-methyl-benzene are added and the reaction mixture is kept at 125° for a further 10 hours. The precipitated product is filtered off with suction at 40°, washed with 100 parts chlorobenzene at 40° and dried in a vacuum at 60° until the weight is constant. 9.4 parts of the pigment dyestuff of the formula

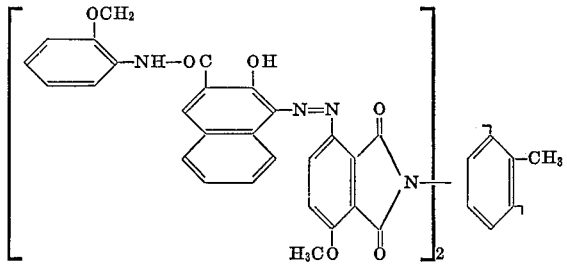

are obtained.

EXAMPLE 10

10.9 parts of the monoazo dyestuff prepared from diazotised 3-amino-6-methyl-phthalic acid and 2-hydroxy-naphthoic acid-(3)-2'-chloroanilide are heated in 500 parts tetralin and 50 parts propionic acid at 120° for 3 hours. 2.12 parts 4,4'-diamino-azobenzene are then added and the reaction mixture is kept at 120° for a further 12 hours. The product is filtered off with suction at 50°, washed with 100 parts tetralin at 50° and dried in a vacuum at 80° until the weight is constant. 10.2 parts of the disazo dyestuff of the formula

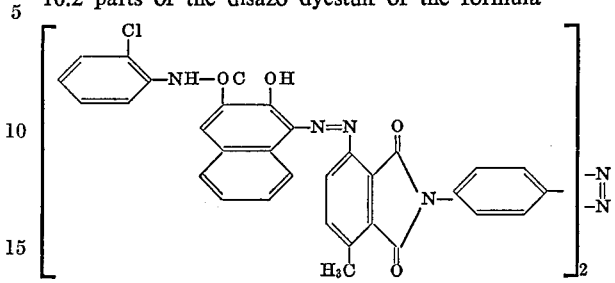

are obtained.

EXAMPLE 11

11.4 parts of the azo dyestuff prepared from diazotised 3-amino-4-chloro-phthalic acid and 2-hydroxy-naphthoic acid-(3)-[naphthyl-(1)]-amide are heated in 500 parts o-dichloro-benzene and 50 parts glacial acetic acid at 120° for 2 hours, 2.42 parts 4,4'-diamino-diphenyl-urea are added and the reaction mixture is kept at 130–140° for a further 15 hours. The precipitated pigment dyestuff is filtered off with suction at 50°, washed with warm o-dichlorobenzene and dried in a vacuum at 80°. Yield: 11.1 parts of the dyestuff of the formula

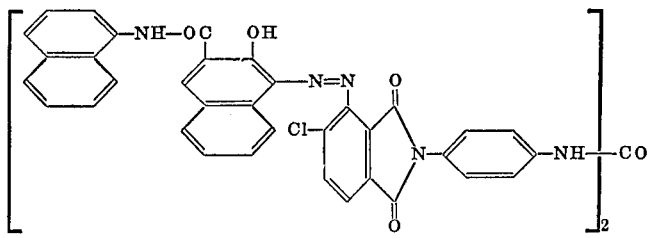

Valuable red pigment dyestuffs are also obtained, when the methods described in the above examples are applied but, instead of the diazo components, coupling components and diamines there mentioned, the diazo and coupling components and the diamines specified in the following table are employed, the 3-amino-phthalic acid being used in the form of the free acids or of the anhydrides:

| Diazo component | Coupling component | Diamine |
|---|---|---|
| 3-amino-phthalic acid | 2-hydroxy-naphthoic acid-(3)-anilide | 4,4'-diamino-diphenyl-methane. |
| Do | do | 4,4'-diamino-diphenyl ether. |
| Do | do | 1,4-diamino-hexahydrobenzene. |
| Do | do | 1,3-diamino-2-methyl-benzene. |
| Do | do | 4,4'-diamino-diphenyl-urea. |
| Do | 2-hydroxy-naphthoic acid-(3)-2'-toluidide | 4,4'-diamino-diphenyl ether. |
| Do | do | 4,4'-diamino-dibenzyl. |
| Do | do | 1,4-diamino-hexahydrobenzene. |
| Do | do | 4,4'-diamino-diphenyl-urea. |
| Do | do | 4,4'-diamino-benzanilide. |
| Do | do | 2,7-diamino-naphthalene. |
| Do | 2-hydroxy-naphthoic acid-(3)-4'-chloro-anilide | 1,4-diamino-2-methyl-benzene. |
| Do | do | 1,3-diamino-benzene. |
| Do | do | 1,3-diamino-2-methyl-benzene. |
| Do | do | 4,4'-diamino-diphenyl-methane. |
| Do | do | 4,4'-diamino-diphenyl ether. |
| Do | do | 4,4'-diamino-diphenylsulphone. |
| Do | do | 2,7-diamino-naphthalene. |
| Do | 2-hydroxy-naphthoic acid-(3)-4'-ethoxy-anilide | 1,3-diamino-benzene. |
| Do | do | 1,3-diamino-2-methyl-benzene. |
| Do | do | 1,4-diamino-hexahydro-benzene. |
| Do | do | 4,4'-diamino-stilbene. |
| Do | do | 4,4'-diamino-diphenyl-urea. |
| Do | do | 4,4'-diamino-azobenzene. |
| Do | 2-hydroxy-naphthoic acid-(3)-2'-anisidide | 4,4'-diamino-diphenyl ether. |
| Do | do | 4,4'-diamino-diphenyl thioether. |
| Do | do | 4,4'-diamino-diphenylsulphone. |
| Do | do | 4,4'-diamino-diphenyl-methane. |
| Do | do | 4,4'-diamino-benzanilide. |
| Do | do | 4,4'-diamino-diphenyl-urea. |
| 3-amino-6-methoxy-phthalic acid | 2-hydroxy-naphthoic acid-(3)-anilide | 1,3-diamino-benzene. |
| Do | do | 4,4'-diamino-diphenyl-sulphone. |
| Do | do | 4,4'-diamino-diphenyl-methane. |
| Do | do | 2,7-diamino-naphthalene. |
| Do | do | 4,4'-diamino-diphenyl ether. |
| Do | do | 4,4'-diamino-diphenyl ether. |
| Do | 2-hydroxy-naphthoic acid-(3)-4'-chloroanilide | 1,3-diamino-2-methyl-benzene. |
| Do | do | 2,7-diamino-diphenylene-oxide. |

| Diazo component | Coupling component | Diamine |
|---|---|---|
| Do | do | 4,4'-diamino-diphenyl-methane. |
| Do | do | 4,4'-diamino-diphenyl ether. |
| Do | do | 2,7-diamino-naphthalene. |
| Do | 2-hydroxy-naphthoic acid-(3)-2'-toluidide | 1,4-diamino-hexahydrobenzene. |
| Do | do | 2,7-diamino-naphthalene. |
| Do | do | 4,4'-diamino-diphenyl-methane. |
| Do | do | 4,4'-diamino-diphenyl-methane. |
| Do | do | 4,4'-diamino-diphenyl ether. |
| Do | 2-hydroxy-naphthoic acid-(3)-4'-ethoxyanilide | 1,4-diamino-2-methyl-benzene. |
| Do | do | 4,4'-diamino-diphenyl ether. |
| Do | do | 4,4'-diamino-diphenyl-sulphone. |
| 3-amino-6-methyl-phthalic acid | 2-hydroxy-naphthoic acid-(3)-anilide | 1,4-diamino-hexahydro-benzene. |
| Do | do | 4,4'-diamino-diphenyl-urea. |
| Do | do | 2,7-diamino-diphenylene-oxide. |
| Do | do | 4,4'-diamino-diphenyl-sulphone. |
| Do | do | 4,4'-diamino-diphenyl-methane. |
| Do | do | 4,4'-diamino-diphenyl ether. |
| Do | do | 2,7-diamino-naphthalene. |
| Do | 2-hydroxy-naphthoic acid-(3)-4'-chloroanilide | 4,4'-diamino-diphenyl-urea. |
| Do | do | 4,4'-diamino-diphenyl-sulphone. |
| Do | do | 1,4-diamino-2-methyl-benzene. |
| Do | do | 4,4'-diamino-diphenyl-methane. |
| Do | do | 4,4'-diamino-diphenyl ether. |
| Do | do | 2,7-diamino-naphthalene. |
| 3-amino-6-chloro-phthalic acid | 2-hydroxy-naphthoic acid-(3)-anilide | 1,4-diamino-2-methyl-benzene. |
| Do | do | 4,4'-diamino-diphenyl ether. |
| Do | do | 4,4'diamino-diphenyl-methane. |
| Do | 2-hydroxy-naphthoic acid-(3)-4'-chloroanilide | 1,4-diamino-hexahydro-benzene. |
| Do | do | 4,4'-diamino-diphenyl ether. |
| Do | do | 4,4'-diamino-diphenyl-methane. |
| Do | 2-hydroxy-naphthoic acid-(3)-2'-toluidide | 1,3-diamino-2-methyl-benzene. |
| Do | do | 4,4'diamino-diphenyl ether. |
| Do | do | 4,4'-diamino-diphenyl-urea. |
| Do | do | 4,4'-diamino-diphenyl-urea. |
| 3-amino-4-methoxy-phthalic acid | 2-hydroxy-naphthoic acid-(3)-anilide | 1,4-diamino-2-methyl-benzene. |
| Do | do | 4,4'-diamino-diphenyl-methane. |
| Do | do | 4,4'-diamino-diphenyl ether. |
| Do | 2-hydroxy-naphthoic acid-(3)-2'-toluidide | 1,3-diamino-benzene. |
| Do | do | 4,4'-diamino-diphenyl-methane. |
| Do | do | 4,4'-diamino-diphenyl-urea. |
| Do | 2-hydroxy-naphthoic acid-(3)-4'-chloranilide | 1,4-diamino-2-methyl-benzene. |
| Do | do | 4,4'-diamino-diphenyl-methane. |
| Do | do | 4,4'-diamino-diphenyl ether. |
| 3-amino-4-chloro-phthalic acid | 2-hydroxy-naphthoic acid-(3)-anilide | 1,3-diamino-2-methyl-benzene. |
| Do | do | 4,4'-diamino-diphenyl-methane. |
| Do | do | 4,4'-diamino-diphenyl-urea. |
| Do | 2-hydroxy-naphthoic acid-(3)-4'-chloroanilide | 4,4'-diamino-diphenyl ether. |
| Do | 2-hydroxy-naphthoic acid-(3)-2'-toluidide | 4,4'-diamino-diphenyl-methane. |
| Do | 2-hydroxy-naphthoic acid-(3)-4'-ethoxy-anilide | 4,4'-diamino-diphenyl-sulphone. |
| Do | 2-hydroxy-naphthoic acid-(3)-2'-methoxy-anilide | 4,4'-diamino-diphenyl ether. |
| 3-amino-phthalic acid | 2-hydroxy-naphthoic acid-(3)-(4'-acetylamino)-anilide | 1,4-diamino-benzene. |
| Do | do | 4,4'-diamino-diphenyl. |
| Do | do | 4,4'-diamino-diphenylmethane. |
| Do | do | 2,7-diamino-naphthalene. |
| Do | do | 4,4'-diamino-2,2'-dichloro-diphenyl. |
| Do | do | 4,4'-diamino-3,3'-dimethyl-diphenyl. |
| Do | 2-hydroxy-naphthoic acid-(3)-(4'-benzoylamino)-anilide | 1,4-diamino-benzene. |
| Do | do | 4,4'-diamino-diphenyl. |
| Do | do | 4,4'-diamino-diphenylmethane. |
| Do | do | 4,4'-diamino-2,2'-dichloro-diphenyl. |
| Do | do | 4,4'-diamino-3,3'-dimethyl-diphenyl. |
| Do | 2-hydroxy-naphthoic acid-(3)-(2'-methyl-4'-methoxy)-anilide | 1,4-diamino-benzene. |
| Do | do | 4,4'-diamino-diphenyl. |
| Do | do | 4,4'-diamino-diphenyl-methane. |
| Do | 2-hydroxy-naphthoic acid-(3)-(2'-ethoxy)-anilide | 1,4-diamino-benzene. |
| Do | do | 4,4'-diamino-diphenyl. |
| Do | do | 4,4'diamino-diphenyl-methane. |
| Do | 2-hydroxy-naphthoic acid-(3)-(2'-methyl-4'-chloro)-anilide | 1,4-diamino-benzene. |
| Do | do | 4,4'-diamino-diphenyl. |
| Do | do | 4,4'-diamino-2,2'-dichloro-diphenyl. |
| Do | 2-hydroxy-naphthoic acid-(3)-2'-toluidide | 4,4'-diamino-diphenyl-methane. |
| Do | 2-hydroxy-naphthoic acid-(3)-4'-ethoxy-anilide | 4,4'-diamino-diphenyl-methane. |
| Do | do | 4,4'-diamino-diphenyl. |

EXAMPLE 12

65 parts 3-amino-phthalic acid are dissolved in 600 parts diluted hydrochloric acid (5:1) and diazotised at 0–5° with a solution of 25 parts sodium nitrite in 100 parts water.

The diazo solution is coupled with a solution of 100 parts 2-hydroxy-naphthoic acid-(3)-2'-toluidide in 700 parts ethanol, to which a solution of 100 parts caustic soda in 200 parts water has been added and which is cooled to 5–10°. The reaction mixture is subsequently stirred at 10–15° for 4 hours, adjusted to pH 1–2 by the addition of 10% hydrochloric acid, the dyestuff is filtered off with suction, washed with water until free from acid, and dried at 80°. 160 parts mono-azo-o-dicarboxylic acid are thus obtained.

20 parts of this monoazo-o-dicarboxylic acid or 19 parts of the corresponding monoazo-o-dicarboxylic anhydride the preparation of which is described in the following paragraph, are heated in 1000 parts o-dichlorobenzene and 50 parts glacial acetic acid (or in 1000 parts glacial acetic acid) with 5.1 parts 2,2'-dichloro-4,4'-diamino-diphenyl at 140–150° for 20–30 hours (under reflux, if working in glacial acetic acid). The reaction mixture is then cooled to 50–60°, the precipitated pigment is filtered off with suction, washed with 500 parts chlorobenzene at 80° and dried in a vacuum at 80°. The yield is 20–22 parts of the red pigment dyestuff of the formula

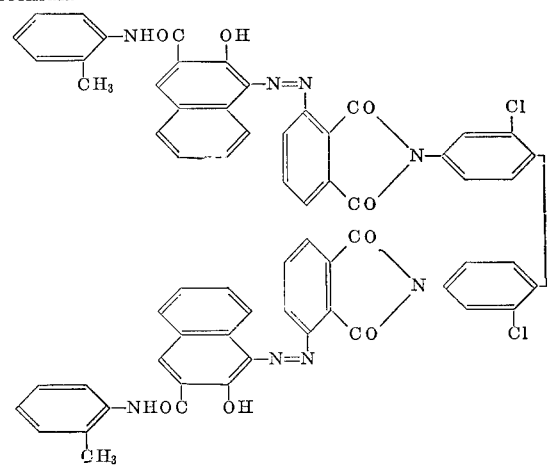

To prepare the above monoazo-o-dicarboxylic anhydride, 50 parts monoazo-o-dicarboxylic acid are suspended in 400 parts chlorobenzene, 40 parts acetic anhydride are added, the reaction mixture is heated at 120° for about 2 hours, cooled to 20°, the product is filtered off with suction, washed with 200 parts methanol in order to remove the acetic anhydride, and dried at 80°. 42 parts monoazo-o-dicarboxylic anhydride of M.P. 332–335° are thus obtained.

The pigment can also be produced in such a manner that the monoazo-o-dicarboxylic anhydride is first intermediarily prepared by heating with glacial acetic acid in o-dichlorobenzene for about 2 hours in the absence of the diamine, the diamine being added only afterwards.

The pigment produced according to the above instructions has good to very good colour strength, and fastness to lacquer coating, light and migration. It is suitable, inter alia, for colouring plastics; for example, pigment incorporated into polyvinyl chloride does not migrate into non-coloured polyvinyl chloride at temperatures up to 70° C. and under prolonged stress.

Valuable red pigment dyestuffs are also obtained, when the methods described in this example are applied but, instead of the diazo component, coupling component and diamine there mentioned, the diazo and coupling components and diamines specified in the following table are employed, the aminophthalic acids being used in the form of the free acids or of the anhydrides.

are obtained. The dyestuff has very good fastness to lacquer coating and light. Its fastness to migration in polyvinyl chloride is excellent. Because of its excellent thermal stability the pigment can be incorporated into copolymers and grafted polymers of acrylonitrile-butadiene-styrene.

EXAMPLE 14

10.3 parts of the monoazo dyestuff prepared from diazotised 3-amino-phthalic acid and 2-hydroxy-naphthoic acid-(3)-4'-chloroanilide are heated in 250 parts o-dichlorobenzene and 25 parts glacial acetic acid at 120° for 2–3 hours, 1.08 parts 1,4-diaminobenzene are then added and the reaction mixture is kept at 130° for a further 8 hours. The pigment is filtered off with suction at 60°, washed with 100 parts warm o-dichlorobenzene and dried in a vacuum. 9.2 parts of the brilliant red disazo dyestuff of the formula

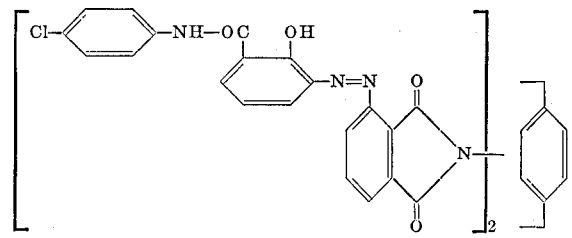

| Diazo component | Coupling component | Diamine |
|---|---|---|
| 3-amino-phthalic acid | 2-hydroxy-naphthoic acid-(3)-(2'-toluidine) | 4,4'-diamino-diphenyl. |
| Do | do | 3,3'-dichloro-4,4'-diamino-diphenyl. |
| Do | do | 3,3'-dimethyl-4,4'-diamino-diphenyl. |
| Do | do | 3,3'-dimethoxy-4,4'-diamino-diphenyl. |
| Do | do | 1,4-diamino-benzene. |
| Do | 2-hydroxy-naphthoic acid-(3)-(2',4'-dimethoxy-5'-chloro)-anilide | 4,4'-diamino-diphenyl. |
| Do | do | 2,2'-dichloro-4,4'-diamino-diphenyl. |
| Do | do | 3,3'-dichloro-4,4'-diamino-diphenyl. |
| Do | do | 1,4-diamino-benzene. |
| Do | 2-hydroxy-naphthoic acid-(3)-(2'-anisidide) | 4,4'-diamino-diphenyl. |
| Do | do | 2,2'-dichloro-4,4'-diamino-diphenyl. |
| Do | do | 3,3'-dichloro-4,4'-diamino-diphenyl. |
| Do | do | 3,3-dimethyl-4,4'-diamino-diphenyl. |
| Do | do | 3,3'-dimethoxy-4,4'-diamino-diphenyl. |
| Do | do | 1,4-diamino-benzene. |
| Do | 2-hydroxy-naphthoic acid-(3)-('-methyl-3'-chloro)-anilide | 1,4-diamino-benzene. |
| Do | do | 3,3'-dichloro-4,4'-diamino-diphenyl. |
| Do | do | 3,3'-dimethyl-4,4'-diamino-diphenyl. |
| Do | 2-hydroxy-naphthoic acid-(3)-(2'-methyl-5'-chloro)-anilide | 4,4'-diamino-diphenyl. |
| Do | do | 2,2'-dichloro-4,4'-diamino-diphenyl. |
| Do | do | 3,3'-dichloro-4,4'-diamino-diphenyl. |
| Do | do | 3,3'-dimethyl-4,4'-diamino-diphenyl. |
| Do | 2-hydroxy-naphthoic acid-(3)-(2',5'-dichloro)-anilide | 4,4'-diamino-diphenyl. |
| Do | do | 2,2'-dichloro-4,4'-diamino-diphenyl. |
| Do | do | 3,3'-dichloro-4,4'-diamino-diphenyl. |
| Do | do | 3,3'-dimethyl-4,4'-diamino-diphenyl. |
| Do | 2-hydroxy-naphthoic acid-(3)-2',5'-dimethoxy-4'-chloro)-anilide | 4,4'-diamino-diphenyl. |
| Do | do | 2,2'-dichloro-4,4'-diamino-diphenyl. |
| Do | do | 3,3'-dichloro-4,4'-diamino-diphenyl. |
| Do | do | 1,4-diamino-benzene. |
| Do | 2-hydroxy-naphthoic acid-(3)-[naphthyl-(2')-]-amide | 4,4'-diamino-diphenyl. |
| Do | do | 2,2'-dichloro-4,4'-diamino-diphenyl. |
| Do | do | 3,3'-dichloro-4,4'-diamino-diphenyl. |
| Do | do | 1,4-diamino-benzene. |

EXAMPLE 13

9.60 parts of the monoazo dyestuff prepared from diazotised 3-amino-phthalic acid and 2-hydroxy-naphthoic acid-(3)-anilide are heated in 500 parts chlorobenzene and 50 parts glacial acetic acid at 100° for 2 hours. 1.08 parts 1,4-diaminobenzene are added and heating is continued at 120–130° for a further 12 hours. The precipitated pigment is filtered off with suction at 50–60°, washed with 100 parts chlorobenzene at 60° and dried in a vacuum at 80° until the weight is constant. 7.2 parts of the red pigment dyestuff of the formula

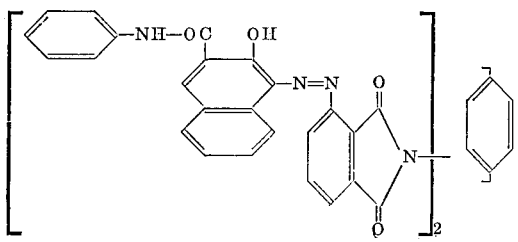

are obtained. The pigment has excellent fastness to lacquer coating, light and migration. Its thermal stability is also excellent and it can therefore be incorporated into copolymers and grafted polymers of acryolnitrile-butadiene-styrene at about 240° without being decomposed.

EXAMPLE 15

90 parts 3-amino-phthalic acid are suspended in 1000 parts water, 500 parts ice and 162 parts concentrated hydrochloric acid are added, and the mixture is diazotised at 0–5° with a solution of 34.5 parts sodium nitrite in 200 parts water.

154 parts 2-hydroxy-naphthoic acid - (3) - 4' - ethoxy-anilide are suspended in 300 parts alcohol, a solution of 80 parts caustic soda in 200 parts water is added, 500 parts ice are thrown in, and the above diazo suspension is then introduced in portions at 5–10°. When the coupling is completed, the reaction mixture is acidified with semi-concentrated hydrochloric acid, the product is filtered off with suction, washed with water until neutral and dried at 80°. The yield of monoazo dyestuff is 218 parts. The dyestuff is converted into the anhydride by heating it in 1000 parts chlorobenzene with 100 parts acetic anhydride at about 100° for 2 hours. The product is filtered off with suction, washed with light petrol, dried at 80°, and 179 parts monoazo-o-dicarboxylic anhydride of M.P. 296–298° are obtained.

10.0 parts of the anhydride and 1.84 parts 4,4′-diamino-diphenyl are heated in 500 parts o-dichlorobenzene and 50 parts glacial acetic acid at 130–140° for 12 hours, the precipitated pigment is filtered off with suction at 60°, washed with 100 parts o-dichlorobenzene at 50° and 100 parts light petrol, and dried. 9.2 parts of the red disazo dyestuff of the formula

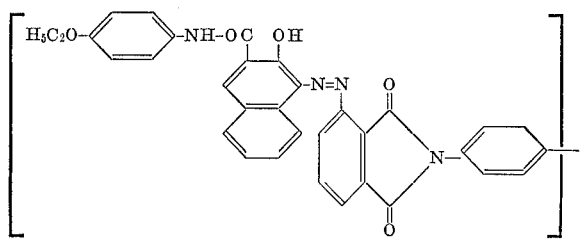

are obtained. The pigment has very good fastness to light and lacquer coating.

EXAMPLE 16

10.5 parts of the monazo dyestuff prepared from diazotised 3-amino-phthalic acid and 2-hydroxy-naphthoic acid-(3)-4′-ethoxy-anilide are heated in 500 parts chlorobenzene and 50 parts glacial acetic at 120° for 4 hours, 2.12 parts 3,3′-dimethyl-4,4′-diamino-diphenyl are then added and the reaction mixture is kept at 130–135° for a further 20 hours. The precipitated pigment is filtered off with suction at about 60°, washed with 100 parts warm chlorobenzene and dried in a vacuum at 80° until the weight is constant. 10.8 parts of the brilliant red pigment dyestuff of the formula

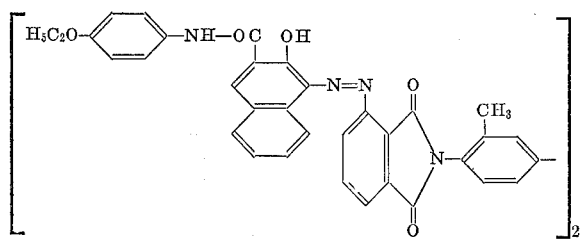

are obtained.

EXAMPLE 17

21 parts 3-amino-6-methoxy-phthalic acid are suspended in 250 parts water, 150 parts ice and 35 parts concentrated hydrochloric acid are added and the mixture is diazotised at 0–5° with a solution of 7.0 parts sodium nitrite in 40 parts water.

30 parts 2-hydroxy-naphthoic acid-(3)-2′-methoxy-anilide are suspended in 40 parts ethanol, 160 parts of a 10% sodium hydroxide solution and 100 parts ice are added, and the above diazo suspension is introduced in portions at 5–10°. The reaction mixture is subsequently stirred at room temperature for 2 hours, acidified with hydrochloric acid (1:1), the dyestuff is filtered off with suction, washed with water until neutral, and dried. Yield: 45 parts monoazo dyestuffs.

10.8 parts of this dyestuff are heated in 250 parts chlorobenzene and 25 parts glacial acetic acid at 110° for 2 hours, 1.08 parts 1,4-diamino-benzene are added and the reaction mixture is kept at 125° for a further 10 hours. The precipitated product is filtered off with suction at 40°, washed with 100 parts chlorobenzene at 40°, and dried in a vacuum at 60° until the weight is constant. 9.4 parts of the pigment dyestuff of the formula

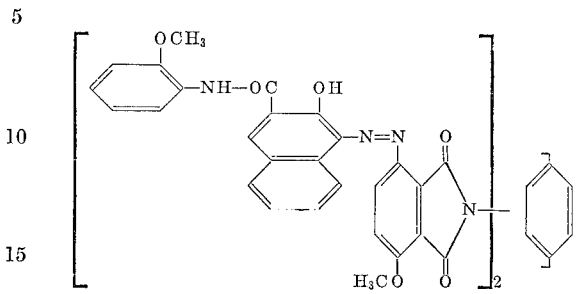

are obtained.

EXAMPLE 18

10.9 parts of the monoazo dyestuff prepared from diazotised 3-amino-6-methyl-phthalic acid and 2-hydroxy-naphthoic acid-(3)-2′-chloroanilide are heated in 500 parts tetralin and 50 parts propionic acid at 120° for 3 hours. 2.53 parts 3,3′-dichloro-4,4′-diamino-diphenyl are then added and the reaction mixture is kept at 120° for a further 12 hours. The product is filtered off with suction at 50°, washed with 100 parts tetralin at 50° and dried in a vacuum at 80° until the weight is constant. 10.2 parts of the disazo dyestuff of the formula

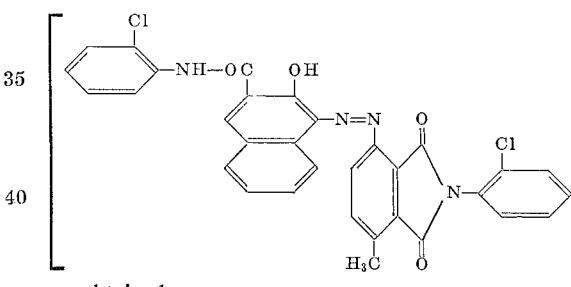

are obtained.

EXAMPLE 19

11.4 parts of the azo dyestuff prepared from diazotised 3-amino-4-chloro-phthalic acid and 2-hydroxy-naphthoic acid-(3)-[naphthyl-(1)]-amide are heated in 500 parts o-dichlorobenzene and 50 parts glacial acetic acid at 120° for 2 hours. 1.84 parts 4,4′-diamino-diphenyl are then added and the reaction mixture is kept at 130–140° for a further 15 hours. The precipitated pigment dyestuff is filtered off with suction at 50°, washed with warm o-dichlorobenzene and dried at 80° in a vacuum. Yield: 11.1 parts of the dyestuff of the formula

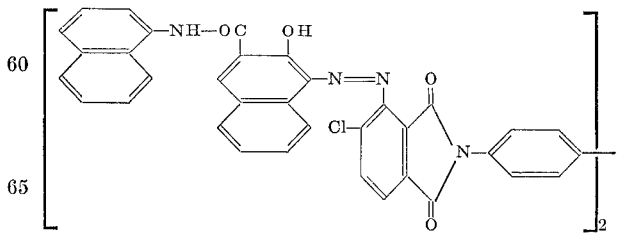

Valuable red pigment dyestuffs are also obtained, when the methods described in the above examples are applied but, instead of the diazo components, coupling components and diamines there mentioned, the diazo and coupling components and the diamines specified in the following table are employed, the 3-amino-phthalic acids being used in the form of the free acids or of the anhydrides.

| Diazo component | Coupling component | Diamine |
|---|---|---|
| 3-aminophthalic acid | 2-hydroxy-naphthoic acid-(3)-anilide | 4,4'-diamino-diphenyl. |
| Do | do | 4,4'-diamino-2,2'-dichloro-diphenyl. |
| Do | do | 4,4'-diamino-3,3'-dichloro-diphenyl. |
| Do | do | 4,4-diamino-3,3'-dimethyl-diphenyl. |
| Do | 2-hydroxy-naphthoic acid-(3)-4'-chloroanilide | 4,4'-diamino-diphenyl. |
| Do | do | 4,4'-diamino-2,2'-dichloro-diphenyl. |
| Do | do | 4,4'-diamino-3,3'-dichloro-diphenyl |
| Do | do | 4,4'-diamino-3,3'-dimethyl-diphenyl |
| Do | 2-hydroxy-naphthoic acid-(3)-2'-chloroanilide | 1,4'-diamino-benzene. |
| Do | do | 4,4'-diamino-diphenyl. |
| Do | do | 4,4'-diamino-2,2'-dichloro-diphenyl. |
| Do | do | 4,4'-diamino-3,3'-dimethyl-diphenyl. |
| Do | 2-hydroxy-naphthoic acid-(3)-4'-ethoxyanilide | 1,4-diamino-benzene. |
| Do | do | 4,4'-diamino-2,2'-dichloro-diphenyl. |
| Do | 2-hydroxy-naphthoic acid-(3)-[naphthyl-(1)]-amide | 1,4-diamino-benzene. |
| Do | do | 4,4'-diamino-diphenyl. |
| Do | do | 4,4'-diamino-2,2'-dichloro-diphenyl. |
| Do | do | 4,4'-diamino-3,3'-dimethyl-diphenyl. |
| Do | do | 4,4'-diamino-3,3'-dimethoxy-diphenyl. |
| Do | 2-hydroxy-naphtoic acid-(3)-3'-nitroanilide | 1,4-diamino-benzene. |
| Do | do | 4,4'-diamino-diphenyl. |
| Do | do | 4,4'-diamino-2,2'-dichloro-diphenyl. |
| Do | do | 4,4'-diamino-3,3'-dimethyl-diphenyl. |
| 3-amino-6-methoxyphthalic acid | 2-hydroxy-naphthoic acid-(3)-anilide | 1,4-diamino-benzene. |
| Do | do | 4,4'-diamino-diphenyl. |
| Do | do | 4,4'-diamino-2,2'-dichloro-diphenyl. |
| Do | do | 4,4'-diamino-3,3'-dimethyl-diphenyl. |
| Do | 2-hydroxy-naphthoic acid-(3)-4'-chloroanilide | 1,4-diamino-benzene. |
| Do | do | 4,4'-diamino-diphenyl. |
| Do | do | 4,4'-diamino-2,2'-dichloro-diphenyl. |
| Do | do | 4,4'-diamino-3,3'-dimethyl-diphenyl. |
| Do | 2-hydroxy-naphthoic acid-(3)-2'-toluidide | 1,4-diamino-benzene |
| Do | do | 4,4'-diamino-2,2'-dichloro-diphenyl. |
| Do | do | 4,4'-diamino-3,3'-dimethyl-diphenyl. |
| Do | do | 4,4'-diamino-diphenyl. |
| Do | 2-hydroxy-naphthoic acid-(3)-4'-ethoxyanilide | 1,4-diamino-benzene. |
| Do | do | 4,4'-diamino-diphenyl. |
| Do | do | 4,4'-diamino-2,2'-dichloro-diphenyl. |
| 3-amino-4-chlorophthalic acid | 2-hydroxy-naphthoic acid-(3)-anilide | 1,4-diamino-benzene. |
| Do | do | 4,4'-diamino-diphenyl. |
| Do | do | 4,4'-diamino-2,2'-dichloro-diphenyl. |
| Do | do | 4,4'-diamino-3,3'-dimethyl-diphenyl. |
| Do | 2-hydroxy-naphthoic acid-(3)-2'-toluidide | 1,4-diamino-benzene. |
| Do | do | 4,4'-diamino-2,2'-dichloro-diphenyl. |
| Do | do | 4,4'-diamino-3,3'-dimethyl-diphenyl. |
| Do | do | 4,4'-diamino-diphenyl. |
| Do | 2-hydroxy-naphthoic acid-(3)-4'-chloroanilide | 1,4-diamino-benzene. |
| Do | do | 4,4'-diamino-2,2'-dichloro-diphenyl. |
| Do | do | 4,4'-diamino-3,3'-dimethyl-diphenyl. |
| Do | do | 4,4'-diamino-diphenyl. |
| Do | 2-hydroxy-naphthoic acid-(3)-4'-ethoxyanilide | 4,4'-diamino-diphenyl. |
| Do | do | 4,4'-diamino-2,2'-dichloro-diphenyl. |
| Do | do | 4,4'-diamino-3,3'-dimethyl-diphenyl. |
| Do | do | 1,4-diamino-benzene. |
| 3-amino-6-methylphthalic acid | 2-hydroxy-naphthoic acid-(3)-anilide | 1-4-diamino-benzene. |
| Do | do | 4,4'-diamino-diphenyl. |
| Do | do | 4,4'-diamino-2,2'-dichloro-diphenyl. |
| Do | do | 4,4'-diamino-3,3'-dimethyl-diphenyl. |
| Do | 2-hydroxy-naphthoic acid-(3)-4'-chloroanilide | 1,4-diamino-benzene. |
| Do | do | 4,4'-diamino-2,2'-dichloro-diphenyl. |
| Do | do | 4,4'-diamino-3,3'-dimethyl-diphenyl. |
| Do | do | 4,4'-diamino-diphenyl. |
| 3-amino-6-chlorophthalic acid | do | 1,4-diamino-benzene. |
| Do | do | 4,4'-diamino-diphenyl. |
| Do | do | 4,4'-diamino-2,2'-dichloro-diphenyl. |
| Do | do | 4,4'-diamino-3,3'-dimethyl-diphenyl. |
| Do | 2-hydroxy-naphthoic acid-(3)-anilide | 1,4-diamino-benzene. |
| Do | do | 4,4'-diamino-diphenyl. |
| Do | do | 4,4'-diamino-2,2'-dichloro-diphenyl. |
| Do | do | 4,4'-diamino-2,2'-dimethyl-diphenyl. |
| Do | do | 4,4'-diamino-diphenyl. |
| Do | do | 4,4'-diamino-2,2'-dichloro-diphenyl. |
| Do | do | 4,4'-diamino-2,2'-dimethyl-diphenyl. |
| Do | 2-hydroxy-naphthoic acid-(3)-2'-toluidide | 1,4-diamino-benzene. |
| Do | do | 4,4'-diamino-diphenyl. |
| Do | do | 4,4'-diamino-2,2'-dichloro-diphenyl. |

We claim:
1. Azo dyestuff which is free from sulfonic acid groups and corresponds to the formula

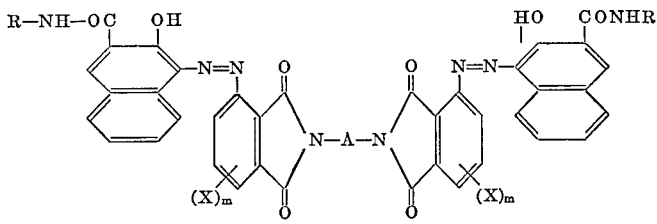

in which the radicals R represent a member selected from the class consisting of naphthyl, phenyl and phenyl substituted with one to three substituents selected from the group consisting of chloro, nitro, methyl, methoxy, ethoxy, acetylamino and benzoylamino; X represents a member selected from the group consisting of nitro, chloro, bromo, fluoro, lower alkyl, lower alkoxy, trifluoromethyl, phenylsulphonyl, methylsulphonyl, ethylsulphonyl, carbo methoxy and carbo ethoxy; $m$ stands for an integer from 0 to 3; and A represents a member selected from the group consisting of phenylene, substituted phenylene, wherein the substituents are 1 to 4 members selected from the group consisting of chloro, methyl, methoxy, ethoxy, and nitro; diphenylene; substituted diphenylene wherein the substituted are selected from the group consisting of chloro, methyl, methoxy, ethoxy, and nitro; cyclohexylene; naphthylene and the divalent radicals

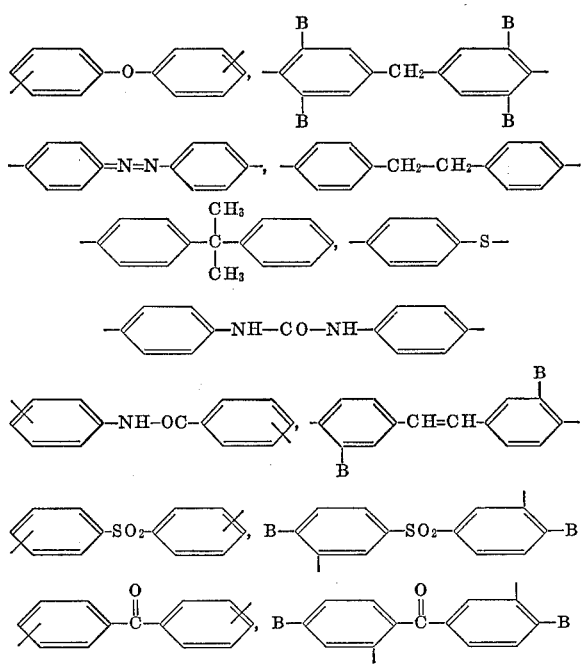

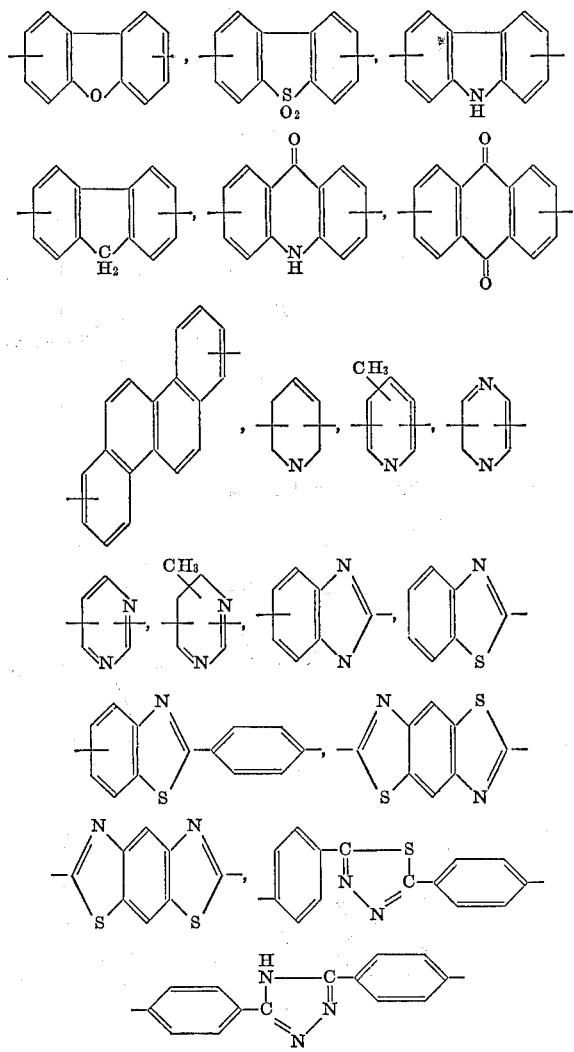

wherein B is selected from the group consisting of hydrogen, chloro, and methoxy and

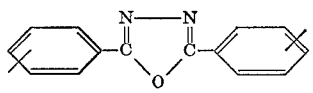

2. Azo dyestuff which is free from sulfonic acid groups and corresponds to the formula

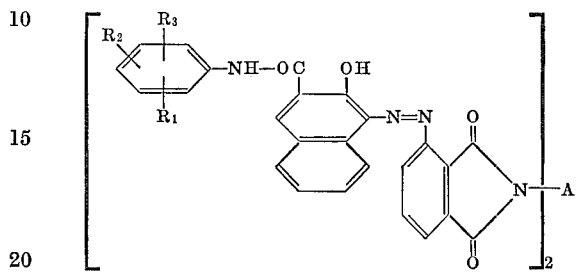

in which $R_1$ stands for hydrogen or chloro, methyl, nitro, methoxy, or ethoxy; $R_2$ stands for hydrogen, or chloro, methyl, or methoxy; $R_3$ stands for hydrogen or chloro; and A represents a member selected from the group consisting of phenylene, substituted phenylene, wherein the substituents are 1 to 4 members selected from the group consisting of chloro, methyl, methoxy, ethoxy, and nitro; diphenylene; substituted diphenylene wherein the substituents are selected from the group consisting of chloro, methyl, methoxy, ethoxy and nitro; cyclohexylene; naphthylene and the divalent radicals

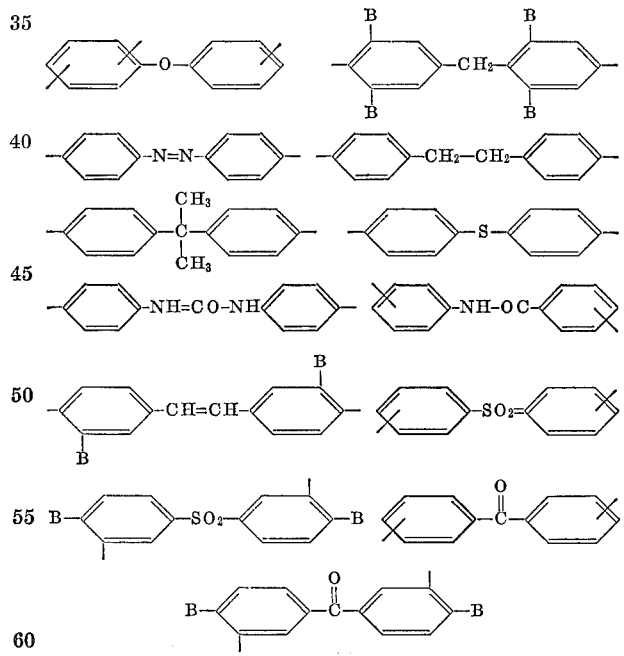

wherein B is selected from the group consisting of hydrogen, chloro, and methoxy

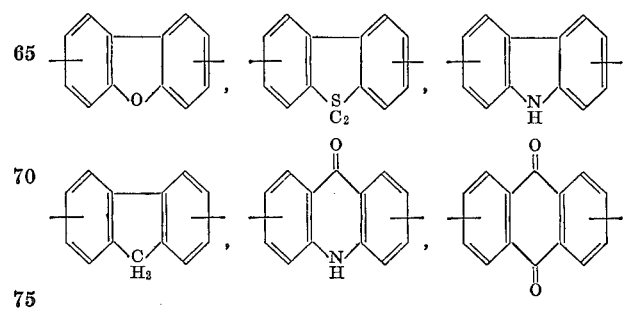

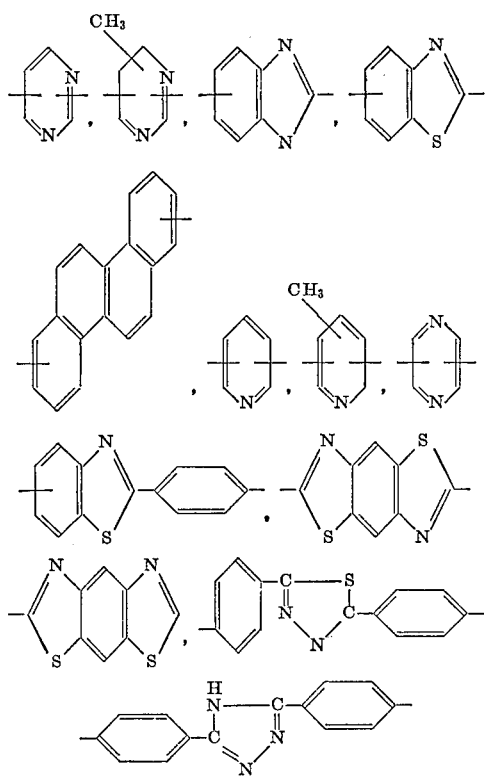
and
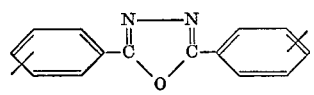
3. The dyestuff of the formula
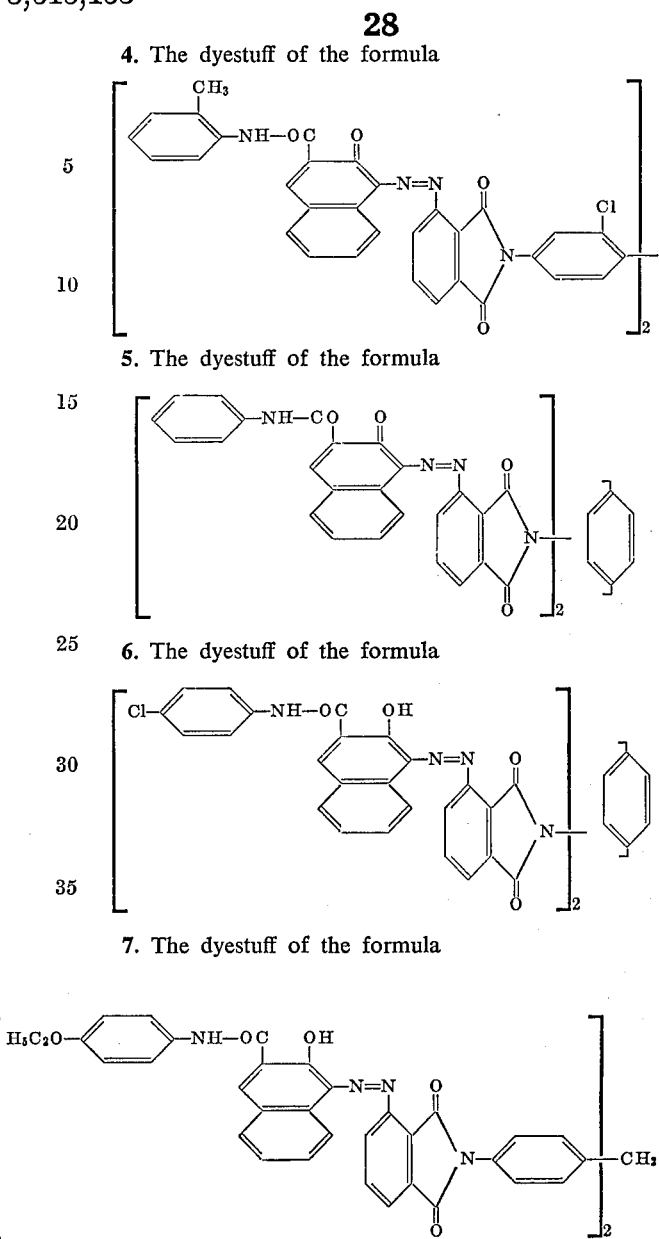
4. The dyestuff of the formula
5. The dyestuff of the formula
6. The dyestuff of the formula
7. The dyestuff of the formula
8. The dyestuff of the formula
9. The dyestuff of the formula

10. The dyestuff of the formula
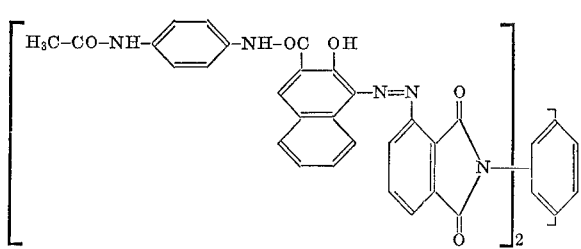
11. The dyestuff of the formula
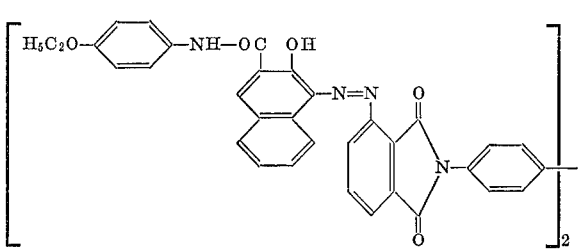
12. The dyestuff of the formula
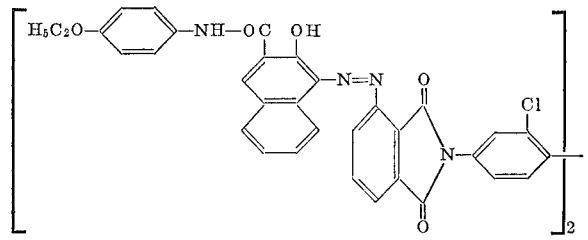
References Cited
UNITED STATES PATENTS
| 2,933,365 | 4/1960 | Moore | 260—152 XR |
| 3,356,672 | 12/1967 | Schefczik | 260—152 |
| 3,402,166 | 9/1968 | Heckl et al. | 260—152 |
FLOYD DALE HIGEL, Primary Examiner
U.S. Cl. X.R.
8—41, 4; 106—22, 23, 288; 117—138.8, 152; 260—37, 41, 41.5, 154, 156, 157, 158, 159, 164, 165, 204, 205, 519, 563, 570, 578

Page 1 of 16

UNITED STATES PATENT OFFICE
CERTIFICATE OF CORRECTION

Patent No. 3,513,153　　　　　　　　　Dated May 19, 1970

Inventor(s) Walter Horstmann, et al.

It is certified that error appears in the above-identified patent and that said Letters Patent are hereby corrected as shown below:

| Column | Line | Error |
|---|---|---|
| 3 | 50 | 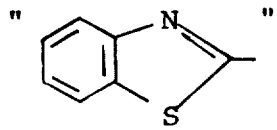 should read 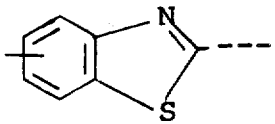 |
| 4 | 30-35 | 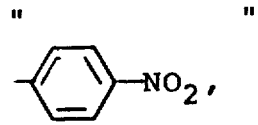 should read 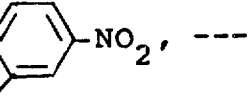 |
| 4 | 40-45 | 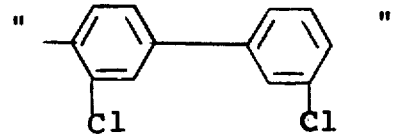 should read 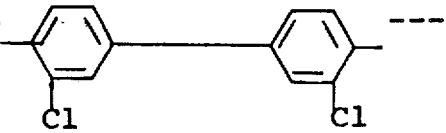 |

Page 2

UNITED STATES PATENT OFFICE
CERTIFICATE OF CORRECTION

Patent No. 3,513,153  Dated May 19, 1970

Inventor(s) Walter Horstmann, et al.

It is certified that error appears in the above-identified patent and that said Letters Patent are hereby corrected as shown below:

| Column | Line | Error |
|---|---|---|
| 4 | 50-55 | 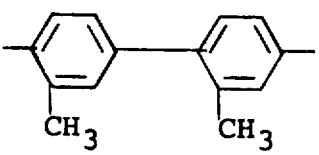 should read 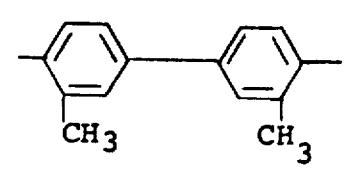 |
| 5 | 45 | 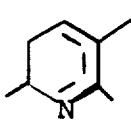 should read 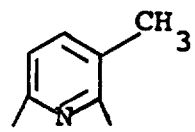 |
| 5 | 45 | 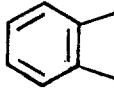 should read 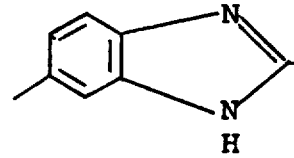 |

UNITED STATES PATENT OFFICE
CERTIFICATE OF CORRECTION

Page 3

Patent No. 3,513,153      Dated May 19, 1970

Inventor(s) Walter Horstmann, et al.

It is certified that error appears in the above-identified patent and that said Letters Patent are hereby corrected as shown below:

| Column | Line | Error |
|---|---|---|
| 5 | 60-65 | |
| 6 | 5 | |
| 6 | 40-45 | |

UNITED STATES PATENT OFFICE
CERTIFICATE OF CORRECTION

Page 4

Patent No. 3,513,153  Dated May 19, 1970

Inventor(s) Walter Horstmann, et al.

It is certified that error appears in the above-identified patent and that said Letters Patent are hereby corrected as shown below:

| Column | Line | Error |
|---|---|---|
| 6 | 50 | "—⟨C₆H₄⟩—NH=CO—NH—⟨C₆H₄⟩—" should read —⟨C₆H₄⟩—NH—CO—NH—⟨C₆H₄⟩— |
| 6 | 50 | "—⟨C₆H₄⟩—NH—OC—⟨C₆H₄⟩—" should read —⟨C₆H₄⟩—NH—OC—⟨C₆H₄⟩— |

Page 5

UNITED STATES PATENT OFFICE
CERTIFICATE OF CORRECTION

Patent No. 3,513,153   Dated May 19, 1970

Inventor(s) Walter Horstmann, et al.

It is certified that error appears in the above-identified patent and that said Letters Patent are hereby corrected as shown below:

| Column | Line | Error |
|---|---|---|
| 6 | 55 | " 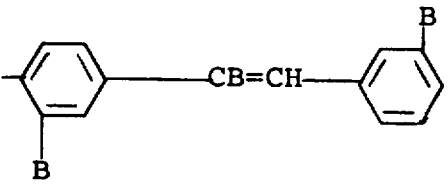 " | should read ---

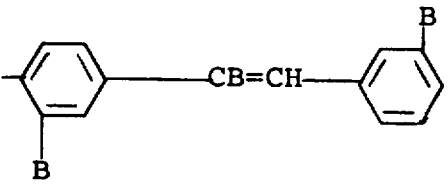

| 6 | 55 | " 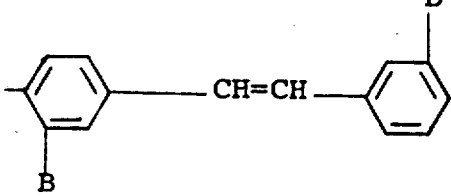 " | should read ---

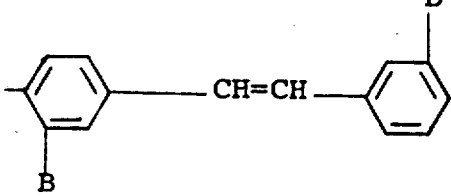     ---

Page 6

UNITED STATES PATENT OFFICE
CERTIFICATE OF CORRECTION

Patent No. 3,513,153      Dated May 19, 1970

Inventor(s) Walter Horstmann, et al.

It is certified that error appears in the above-identified patent and that said Letters Patent are hereby corrected as shown below:

| Column | Line | Error | | |
|---|---|---|---|---|
| 7 | 10 | " 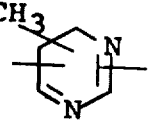 " | should read | |
| | | --- 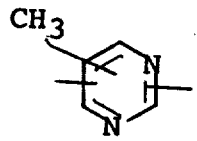 | --- | |
| 7 | 20 | " 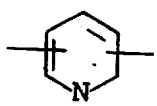 " | should read | |
| | | --- 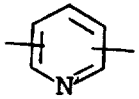 | --- | |

Page 7

PO-1050
(5/69)

UNITED STATES PATENT OFFICE
CERTIFICATE OF CORRECTION

Patent No. 3,513,153          Dated  May 19, 1970

Inventor(s) Walter Horstmann, et al.

It is certified that error appears in the above-identified patent and that said Letters Patent are hereby corrected as shown below:

| Column | Line | Error |
|---|---|---|
| 7 | 25-30 (1st one in) | 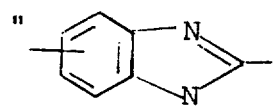 should read --- 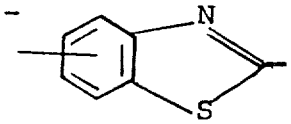 --- |
| 8 | 25 | "ester-1 ()" should read --- ester-(1) --- |
| 8 | 43 | "naphthoic acid-(2)-" should read --- naphthoic acid-(3)- --- |
| 9 | 26 | "4,4-diamino-" should read --- 4,4'-diamino- --- |
| 9 | 35 | "4,4-diamino-" should read --- 4,4'-diamino- --- |
| 9 | 74-75 | "benzenes, nitrobenzene," should read --- benzene, o-, m- p-dichlorobenzene, trichlorobenzenes, nitrobenzene, --- |
| 10 | 11 | "(II) of" should read --- (II) or --- |
| 12 | 41 | "50 parts" should read --- 500 parts --- |

Page 8
UNITED STATES PATENT OFFICE
CERTIFICATE OF CORRECTION

Patent No. 3,513,153  Dated May 19, 1970

Inventor(s) Walter Horstmann, et al.

It is certified that error appears in the above-identified patent and that said Letters Patent are hereby corrected as shown below:

| Column | Line | Error |
|---|---|---|
| 14 | Formula Example 6 | " 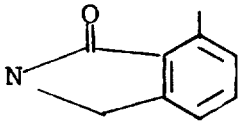 "  should read --- 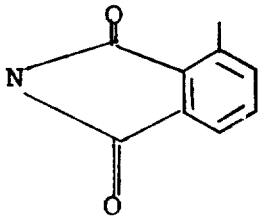 --- |
| 15/16 | 3rd line from the bottom | This line should be deleted |
| 17/18 | 7th line from top | This line should be deleted |
| 17/18 | 34th line from top | This line should be deleted |

Page 9

UNITED STATES PATENT OFFICE
CERTIFICATE OF CORRECTION

Patent No. 3,513,153　　　　　　　　Dated May 19, 1970

Inventor(s) Walter Horstmann, et al.

It is certified that error appears in the above-identified patent and that said Letters Patent are hereby corrected as shown below:

| Column | Line | Error |
|---|---|---|
| 19 | Table - 16, 17, 18 | "2-hydroxy-naphthoic acid-(3)-('methyl-" should read --- 2-hydroxy-naphthoic acid-(3)-(2'methyl- --- |
| 20 | 20 | 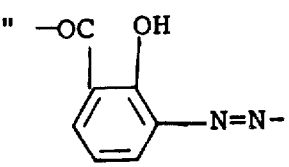 should read --- 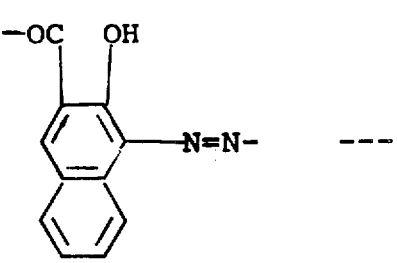 --- |
| 20 | 58 | "acryolnitrile-" should read --- acrylonitrile --- |
| 21 | 15-25 Formula | " ] "  should read --- ]₂ --- |

Page 10

UNITED STATES PATENT OFFICE
CERTIFICATE OF CORRECTION

Patent No. 3,513,153          Dated May 19, 1970

Inventor(s) Walter Horstmann, et al.

It is certified that error appears in the above-identified patent and that said Letters Patent are hereby corrected as shown below:

| Column | Line | Error |
|---|---|---|
| 23 | 69 | 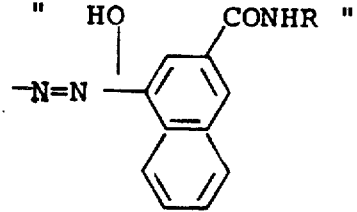 should read --- 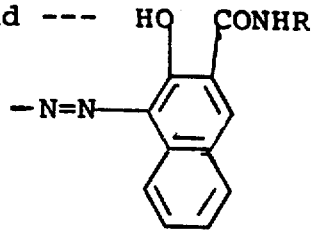 |
| 23/24 | 71-73 (of the Table) | These lines should be deleted |
| 24 | Claim 1 74 | "the substituted" should read --- the substituents --- |
| 25 | Claim 1 5-10 | 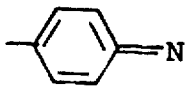 should read --- 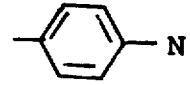 --- |

Page 11

UNITED STATES PATENT OFFICE
CERTIFICATE OF CORRECTION

Patent No. 3,513,153                    Dated May 19, 1970

Inventor(s) Walter Horstmann, et al.

It is certified that error appears in the above-identified patent and that said Letters Patent are hereby corrected as shown below:

| Column | Line | Error |
|--------|------|-------|
| 25 | Claim 1<br>10-15 | " 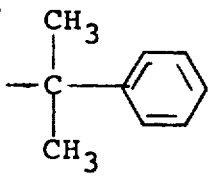 <br><br>should read --- 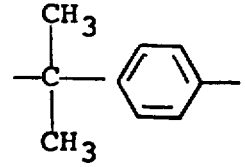 --- |
| 25 | Claim 1<br>10-15 | " 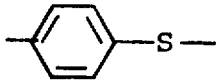 " <br><br>should read --- 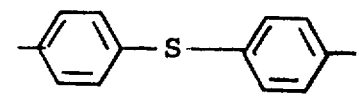 --- |
| 25 | Claim 1<br>25-30 | " 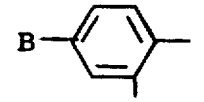 " <br><br>should read --- 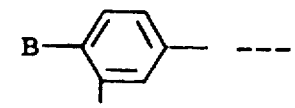 --- |

Page 12

UNITED STATES PATENT OFFICE
CERTIFICATE OF CORRECTION

Patent No. 3,513,153      Dated May 19, 1970

Inventor(s) Walter Horstmann, et al.

It is certified that error appears in the above-identified patent and that said Letters Patent are hereby corrected as shown below:

| Column | Line | Error |
|---|---|---|
| 25 | 50 | " 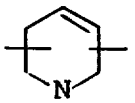 " should read ---  --- |
|  |  | " 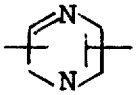 " should read ---  --- |
|  | 55 | " 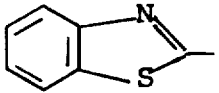 " should read --- 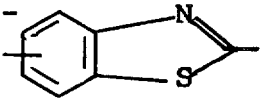 --- |
| 26 | 50 | " 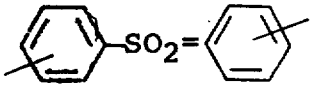 " should read --- 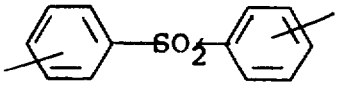 --- |

Page 13

UNITED STATES PATENT OFFICE
CERTIFICATE OF CORRECTION

Patent No. 3,513,153  Dated May 19, 1970

Inventor(s) Walter Horstmann, et al.

It is certified that error appears in the above-identified patent and that said Letters Patent are hereby corrected as shown below:

| Column | Line | Error |
|---|---|---|
| 26 | 65-70 | |

" 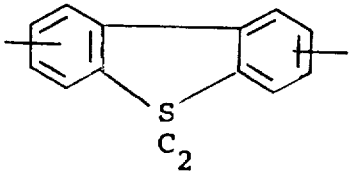 "

should read --- 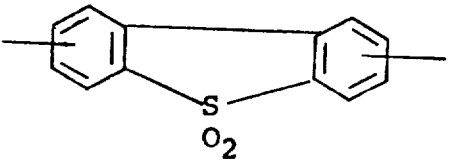 ---

Page 14    UNITED STATES PATENT OFFICE
           CERTIFICATE OF CORRECTION

Patent No. 3,513,153                    Dated  May 19, 1970

Inventor(s)  Walter Horstmann, et al.

It is certified that error appears in the above-identified patent and that said Letters Patent are hereby corrected as shown below:

| Column | Line | Error |
|---|---|---|
| 27 | 5 | 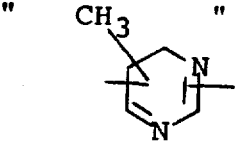 |
| | | should read --- 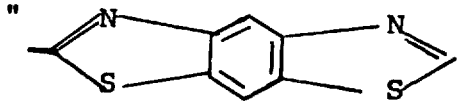 --- |
| 27 | 25 | 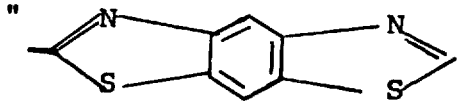 |
| | | should read --- |

FORM PO-1050 (10-69)

Page 15

PO-1050
(5/69)

UNITED STATES PATENT OFFICE
CERTIFICATE OF CORRECTION

Patent No. 3,513,153  Dated May 19, 1970

Inventor(s) Walter Horstmann, et al.

It is certified that error appears in the above-identified patent and that said Letters Patent are hereby corrected as shown below:

| Column | Line | Error |
|---|---|---|
| 27 | Claim 2, 25 | " 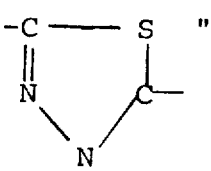 " should read --- 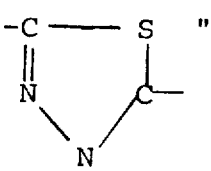 |
| 28 | Claim 4 Formula | " 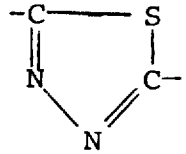 " should read --- 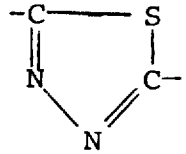 --- |

Page 16

PO-1050
(5/69)

UNITED STATES PATENT OFFICE
CERTIFICATE OF CORRECTION

Patent No. 3,513,153          Dated May 19, 1970

Inventor(s) Walter Horstmann, et al.

It is certified that error appears in the above-identified patent and that said Letters Patent are hereby corrected as shown below:

| Column | Line | Error |
|---|---|---|
| 28 | Claim 5 Formula 15 | " 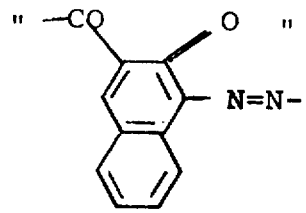 " | should read --- 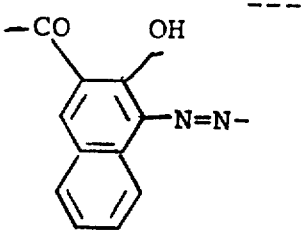 ---

SIGNED AND SEALED

FEB 23 1971

(SEAL)
Attest:

Edward M. Fletcher, Jr.
Attesting Officer

WILLIAM E. SCHUYLER, JR.
Commissioner of Patents